(12) United States Patent
Mallari et al.

(10) Patent No.: US 6,808,840 B2
(45) Date of Patent: *Oct. 26, 2004

(54) SILICON-BASED FUEL CELL ELECTRODE STRUCTURES AND FUEL CELL ELECTRODE STACK ASSEMBLIES

(75) Inventors: Jonathan C. Mallari, Seattle, WA (US); Chung M. Chan, Bellevue, WA (US)

(73) Assignee: Neah Power Systems, Inc., Bothell, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/839,786

(22) Filed: Apr. 19, 2001

(65) Prior Publication Data

US 2003/0044674 A1 Mar. 6, 2003

Related U.S. Application Data

(63) Continuation-in-part of application No. 09/715,830, filed on Nov. 17, 2000, now Pat. No. 6,641,948.
(60) Provisional application No. 60/200,866, filed on May 2, 2000, provisional application No. 60/189,205, filed on Mar. 14, 2000, and provisional application No. 60/166,372, filed on Nov. 17, 1999.

(51) Int. Cl.[7] .............................................. H01M 4/86
(52) U.S. Cl. ............................................ 429/44; 429/40
(58) Field of Search ..................................... 429/40, 44

(56) References Cited

U.S. PATENT DOCUMENTS 5,958,616 A * 9/1999 Salinas et al. ................ 429/41

FOREIGN PATENT DOCUMENTS

DE 19820756 C1 * 11/1999
FR 2667728 A1 * 4/1992

OTHER PUBLICATIONS

Shackelford, James, "Introduction to Materials Science for Engineers, Third Edition," Macmillan Publishing Company, 1992 (no month), pp. 579–583.*

* cited by examiner

Primary Examiner—Bruce F. Bell
Assistant Examiner—Jonathan Crepeau
(74) Attorney, Agent, or Firm—Thomas E. Loop

(57) ABSTRACT

The present invention is directed to silicon electrode structures and silicon electrode assemblies associated with fuel cell systems, as well as to methods relating thereto. In one embodiment, the present invention is directed to an electrode structure adapted for use with a fuel cell system such as, for example, a direct methanol fuel cell system. In this embodiment, the invention may be characterized in that the electrode structure comprises a silicon substrate having one or more selectively doped regions thereon, wherein each of the one or more selectively doped regions is adapted to function as a current collector for the transmission of an electrical current. In another embodiment, the electrode structure comprises a silicon substrate having one or more discrete porous bulk matrix regions disposed across a top surface, wherein each of the one or more discrete bulk matrix porous regions is defined by a plurality pores that extend into the silicon substrate, wherein the plurality of pores defines inner pore surfaces, and wherein the inner pores surfaces have catalyst particles uniformly dispersed thereon.

6 Claims, 37 Drawing Sheets

- Silicon Substrate
- Silicon Nitride
- Photoresist
- Silicon Dioxide

- Silicon Substrate
- Silicon Nitride
- Silicon Dioxide

| ▨ | Silicon Substrate | ▦ | Silicon Dioxide |
| ▧ | Silicon Nitride | ▨ | Photoresist |

☒ Silicon Substrate   ▦ Silicon Dioxide
☒ Silicon Nitride    ☒ Photoresist

☒ Silicon Substrate   ▦ Silicon Dioxide
☒ Silicon Nitride

☒ Silicon Substrate   ▦ Silicon Dioxide
☒ Silicon Nitride    ☐ Flow Channel

☒ Silicon Substrate   ▦ Silicon Dioxide
☒ Silicon Nitride    ☐ Flow Channel
■ Ti-W:Au

| | Silicon Substrate | | Silicon Dioxide |
|---|---|---|---|
| | Silicon Nitride | | Flow Channel |
| | Ti-W:Au | | Photoresist |

| | Silicon Substrate | | Silicon Dioxide |
|---|---|---|---|
| | Silicon Nitride | | Flow Channel |
| | Ti-W:Au | | Photoresist |
| | Ti-W:Au | | |

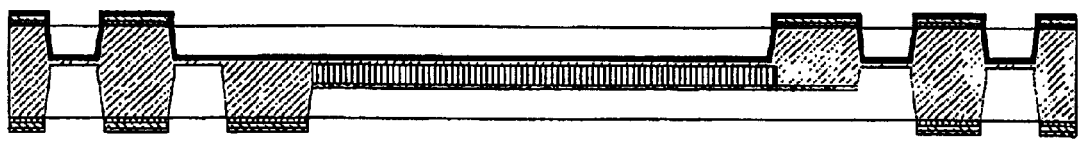
*Figure* 22
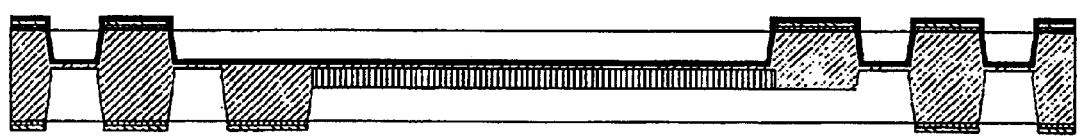
*Figure* 23
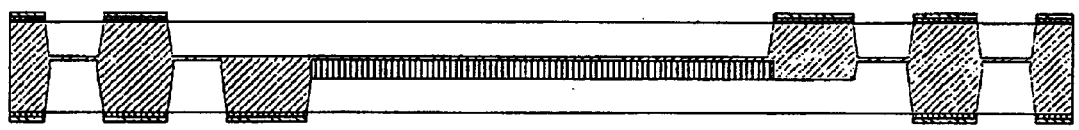
*Figure* 24

| | | | |
|---|---|---|---|
| ▨ Silicon Substrate | | ▦ Silicon Dioxide | |
| ▧ Silicon Nitride | | ☐ Flow Channel | |
| ▥ Porous Silicon | | ▨ Photoresist | |

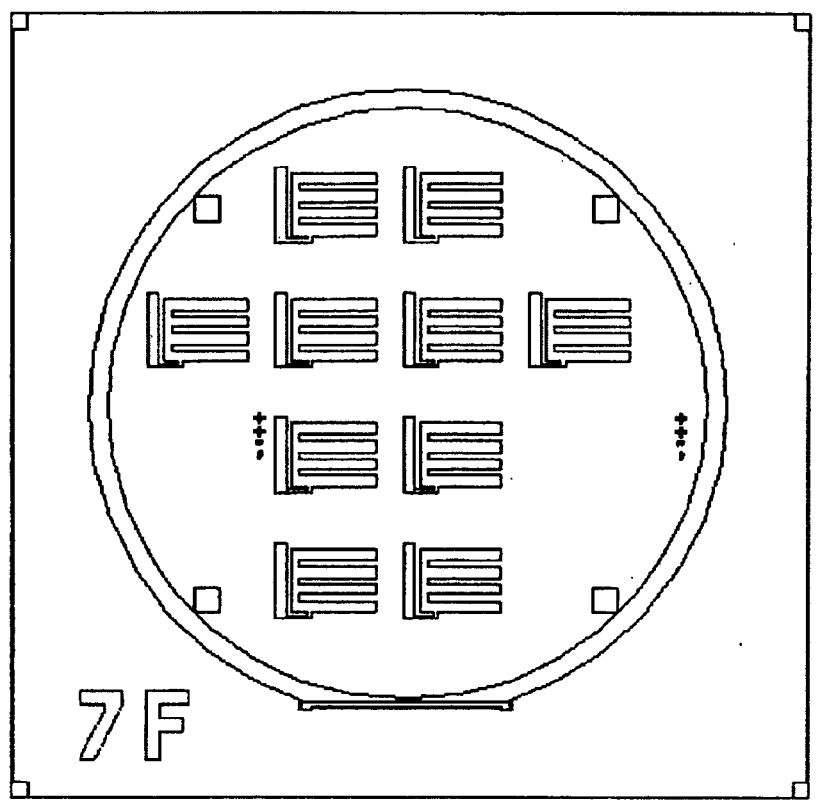
*Figure* 32A
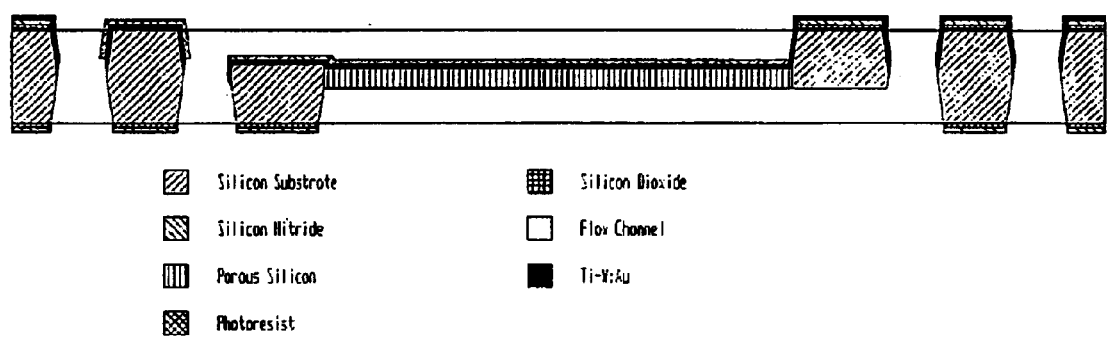
*Figure* 32B

◪ Silicon Substrate

◪ Silicon Substrate
▨ Silicon Nitride

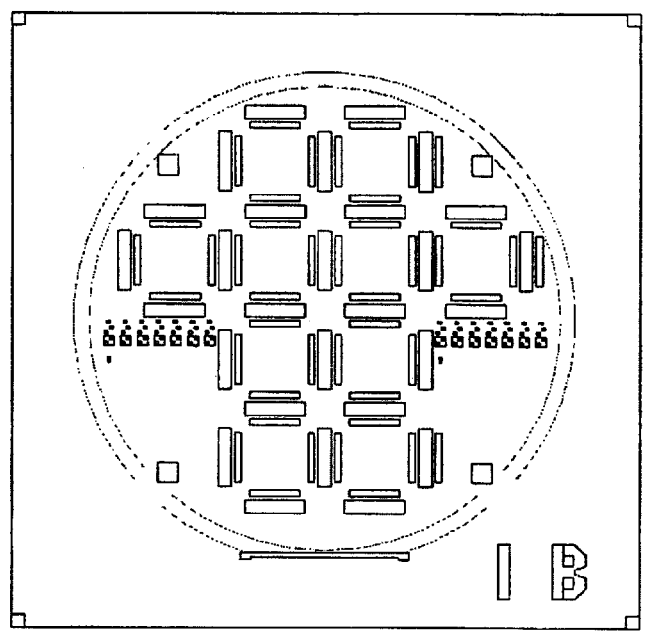
*Figure* 41A
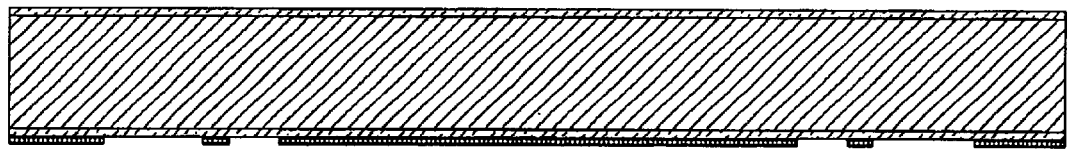
▨ Silicon Substrate
▨ Silicon Nitride
■ Photo Resists
*Figure* 41B ◨ Silicon Substrate
▨ Silicon Nitride ◨ Silicon Substrate
▨ Silicon Nitride ◨ Silicon Substrate
▨ Silicon Nitride
▥ Aluminum Contact

| | |
|---|---|
| ▨ Silicon Substrate | ▦ Photo Resists |
| ▨ Silicon Nitride | |
| ▨ Aluminum Contact | |

- Silicon Substrate
- Silicon Nitride
- Aluminum Contact
- Photo Resists

- Silicon Substrate
- Silicon Nitride
- Aluminum Contact

☒ Silicon Substrate  ▓ Porous Silicon
☒ Silicon Nitride
■ Aluminum Contact

☒ Silicon Substrate
☒ Silicon Nitride  ▓ Porous Silicon

| ▨ Silicon Substrate | ▨ Aluminum Contact |
| ▨ Silicon Nitride | ▨ Porous Silicon |
| ▨ Photo Resists | |

- ▨ Silicon Substrate
- ▨ Silicon Nitride
- ▪ Photo Resists
- ▨ Aluminum Contact
- ▦ Porous Silicon

- ▨ Silicon Substrate
- ▨ Silicon Nitride
- ▨ Aluminum Contact
- ▦ Porous Silicon ▨ Silicon Substrate     ▦ Photo Resists ▧ Metal Seed Layer     ▦ Porous Silicon

SILICON-BASED FUEL CELL ELECTRODE STRUCTURES AND FUEL CELL ELECTRODE STACK ASSEMBLIES

CROSS-REFERENCE TO RELATED APPLICATIONS

This application is a continuation-in-part of U.S. patent application Ser. No. 09/715,830, now U.S. Pat. No. 6,641,948, filed Nov. 17, 2000; which application claims priority to U.S. Provisional Patent Application No. 60/200,866 filed May 2, 2000; U.S. Provisional Patent Application No. 60/189,205 filed Mar. 14, 2000; and U.S. Provisional Patent Application No. 60/166,372 filed Nov. 17, 1999; all of which are incorporated herein by reference in their entireties.

TECHNICAL FIELD

The present invention relates generally to fuel cell systems and, more specifically, to silicon electrode structures and silicon electrode assemblies associated with fuel cell systems.

BACKGROUND OF THE INVENTION

A fuel cell is an energy conversion device that consists essentially of two opposing electrodes, an anode and a cathode, ionically connected together via an interposing electrolyte. Unlike a battery, fuel cell reactants are supplied externally rather than internally. Fuel cells operate by converting fuels, such as hydrogen or methanol, to electrical power through an electrochemical process rather than combustion. It does so by harnessing the electrons released from controlled oxidation-reduction reactions occurring on the surface of a catalyst. A fuel cell system can produce electricity continuously so long as fuel is supplied from an outside source.

In electrochemical fuel cells employing methanol as the fuel supplied to the anode (also commonly referred to as a "Direct Methanol Fuel Cell" (DMFC) system), the electrochemical reactions are essentially as follows: first, a methanol molecule's carbon-hydrogen, and oxygen-hydrogen bonds are broken to generate electrons and protons; simultaneously, a water molecule's oxygen-hydrogen bond is also broken to generate an additional electron and proton. The carbon from the methanol and the oxygen from the water combine to form carbon dioxide. Oxygen from air supplied to the cathode is reduced to anions with the addition of electrons. From a molecular perspective, the electrochemical reactions occurring within a direct methanol fuel cell (DMFC) are as follows:

Anode: 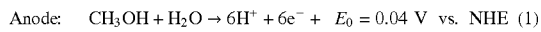  (1)

Cathode: 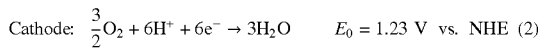 (2)

Net: 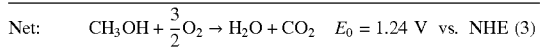 (3)

The various electrochemical reactions associated with other state-of-the-art fuel cell systems (e.g., hydrogen or carbonaceous fuel) are likewise well known to those of ordinary skill in the art.

With respect to state-of-the-art fuel cell systems generally, several different configurations and structures have been contemplated—most of which are still undergoing further research and development. In this regard, existing fuel cell systems are typically classified based on one or more criteria, such as, for example, (1) the type of fuel and/or oxidant used by the system, (2) the type of electrolyte used in the electrode stack assembly, (3) the steady-state operating temperature of the electrode stack assembly, (4) whether the fuel is processed outside (external reforming) or inside (internal reforming) the electrode stack assembly, and (4) whether the reactants are fed to the cells by internal manifolds (direct feed) or external manifolds (indirect feed). In general, however, it is perhaps most customary to classify existing fuel cell systems by the type of electrolyte (i.e., ion conducting media) employed within the electrode stack assembly. Accordingly, most state-of-the-art fuel cell systems have been classified into one of the following known groups:

1. Alkaline fuel cells (e.g., electrolyte is KOH);
2. Acid fuel cells (e.g., electrolyte is phosphoric acid);
3. Molten carbonate fuel cells (e.g., electrolyte is 63% $Li_2CO_3$/37% $K_2CO_3$);
4. Solid oxide fuel cells (e.g., electrolyte is yttria-stabilized zirconia);
5. Proton or ion exchange membrane fuel cells (e.g., electrolyte is NAFION).

Although these state-of-the-art fuel cell systems are known to have many diverse structural and operational characteristics, such conventional systems nevertheless share common characteristics with respect to their electrode design. For example, conventional fuel cell electrode structures are generally constructed to serve two principal functions: (1) the first is to electrocatalyze the fuel or oxidizer, and (2) the second is to electrically conduct released electrons out of the fuel cell and to the electrical load. Because these two principal functions are generally not obtainable by a single state-of-the-art electrode material, most conventional electrode designs comprise a layered structure that includes, for example, a support substrate (e.g., a graphite or plastic plate having a flow field channel patterned thereon), a catalytic active layer (e.g., a carbon-fiber sheet or layer having affixed or embedded catalyst particles), and a current collector layer (e.g., a gold mesh) for the transmission of the generated electrical current. Such conventional electrode designs may be advantageous for vehicular and other larger scale power applications, but are problematic for smaller scale stationary applications such as, for example, miniature fuel cell systems for portable electronic applications. In short, conventional electrode platforms (with their several layers of disparate materials) are difficult to fabricate on a micro-scale basis.

Although significant progress has been made with respect to these and other fuel cell system problems, there is still a need in the art for improved fuel cell electrode structures and fuel cell electrode stack assemblies, as well as to methods relating thereto. The present invention fulfills these needs and provides for further related advantages.

SUMMARY OF THE INVENTION

In brief, the present invention relates generally to fuel cell systems and, more specifically, to silicon electrode structures and silicon electrode assemblies associated with fuel cell systems, as well as to methods relating thereto. In one embodiment, the present invention is directed to an electrode structure adapted for use with a fuel cell system such as, for example, a direct methanol fuel cell system. In this embodiment, the invention may be characterized in that the electrode structure comprises a silicon substrate having one or more selectively doped regions thereon, wherein each of the one or more selectively doped regions is adapted to function as a current collector for the transmission of an electrical current.

In another embodiment, the present invention is directed to an electrode structure adapted for use with a fuel cell system. In this embodiment, the electrode structure comprises a silicon substrate having one or more discrete porous bulk matrix regions disposed across a top surface, wherein each of the one or more discrete bulk matrix porous regions is defined by a plurality pores that extend into the silicon substrate, wherein the plurality of pores define inner pore surfaces, and wherein the inner pores surfaces have catalyst particles uniformly dispersed thereon.

These and other aspects of the present invention will become more evident upon reference to following detailed description and attached drawings. It is to be understood that various changes, alterations, and substitutions may be made to the teachings contained herein without departing from the spirit and scope of the present invention. It is to be further understood that the drawings are illustrative (hence, not necessarily to scale) and symbolic representations of exemplary embodiments of the present invention.

BRIEF DESCRIPTION OF THE DRAWINGS

FIG. 7 illustrates a magnified view of a silicon substrate having a plurality of catalyst particles uniformly dispersed thereon in accordance with an embodiment of the present invention.

FIGS. 8–37 illustrate sequential side cross-sectional views of a silicon substrate that has been subjected to various process steps in accordance with an embodiment of the present invention.

FIGS. 39–64 illustrate sequential side cross-sectional views of a silicon substrate that has been subjected to various process steps in accordance with an embodiment of the present invention.

DETAILED DESCRIPTION OF THE INVENTION

Figures 1A, 1B:
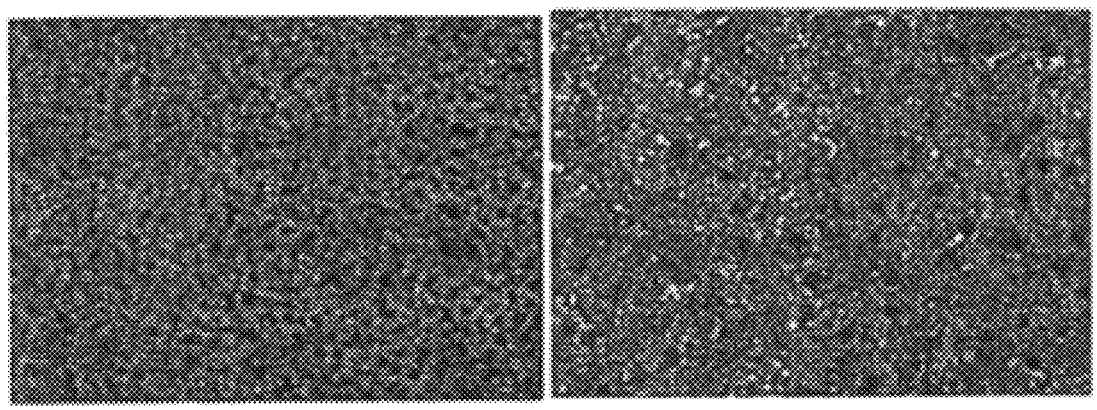
FIGS. 1A and 1B illustrate magnified top views of a porous silicon substrate having an array of acicular pores useful as a support substrate in accordance with an embodiment of the present invention.
Figure 2:
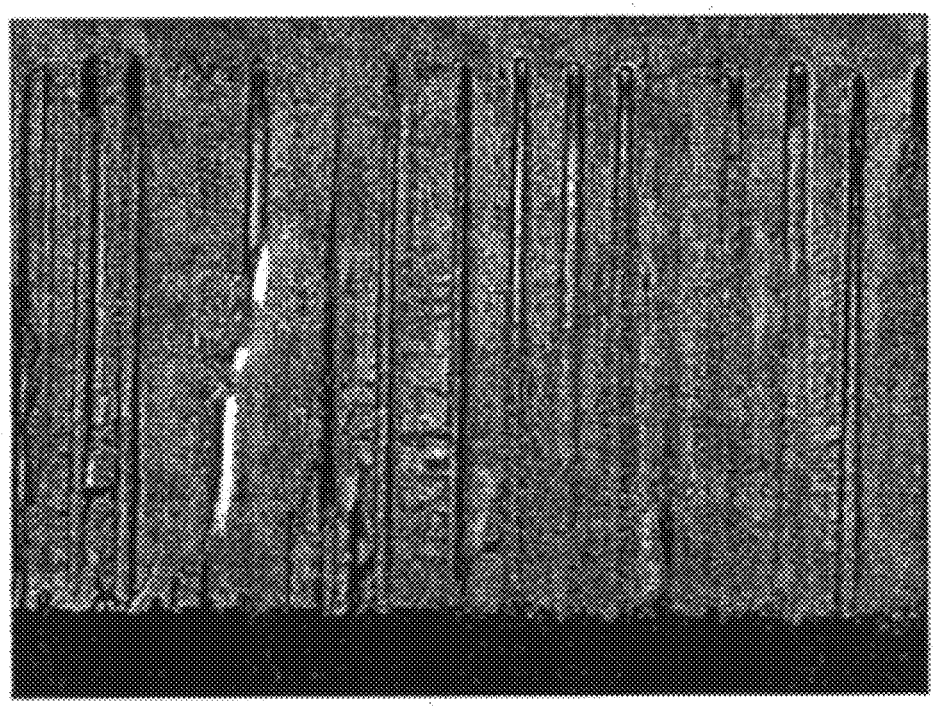
FIG. 2 illustrates a magnified side view of a porous silicon substrate having an array of acicular pores useful as a support substrate in accordance with an embodiment of the present invention.
Figure 3:
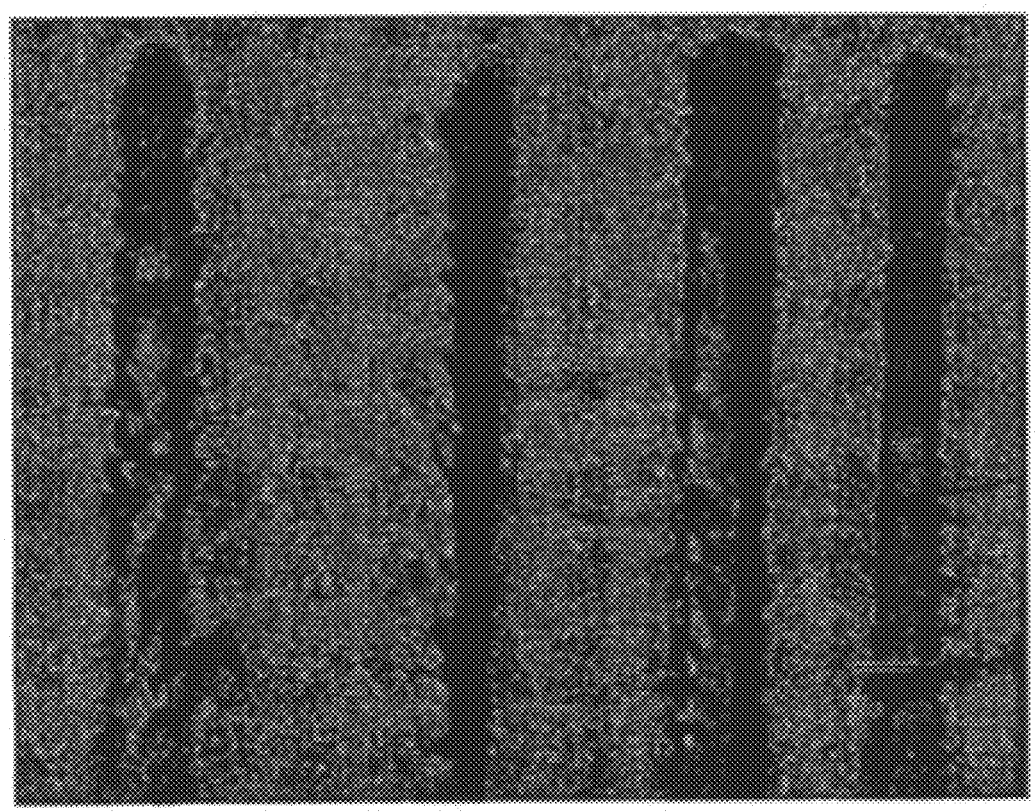
FIG. 3 illustrates a further magnified side view of the porous silicon of FIG. 2.
Figure 4:
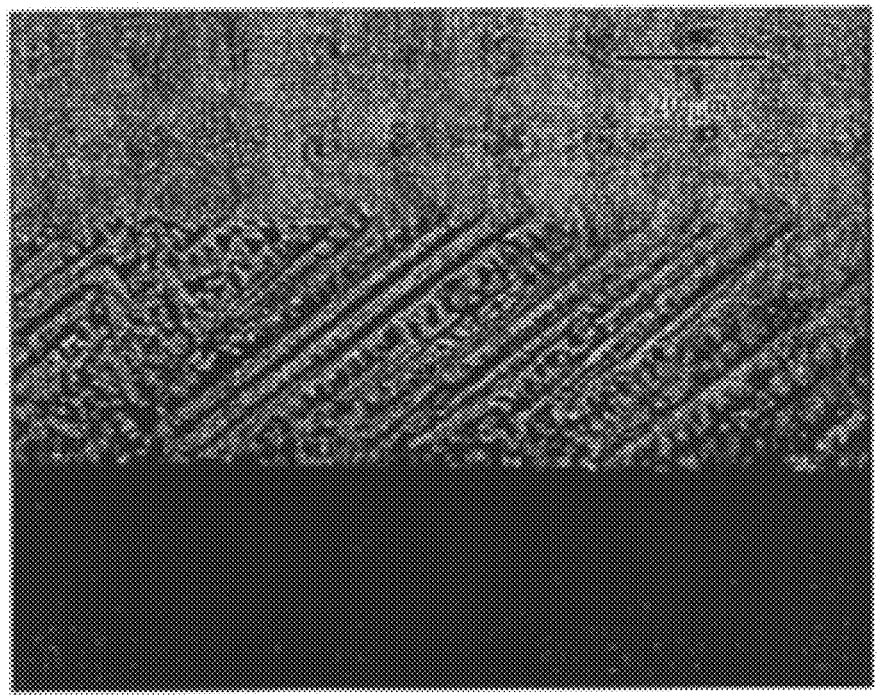
FIG. 4 illustrates a magnified side view of a porous silicon substrate useful as a support substrate in accordance with an embodiment of the present invention.
Figure 5:
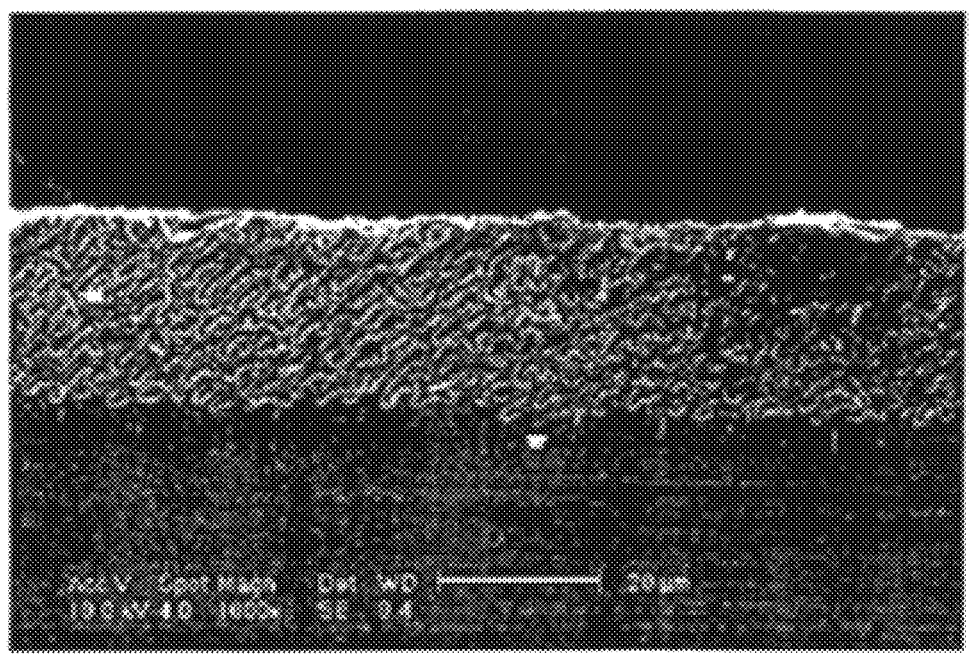
FIG. 5 illustrates a magnified side view of a porous "Kielovite" silicon substrate useful as a support substrate in accordance with an embodiment of the present invention.
Figure 6:
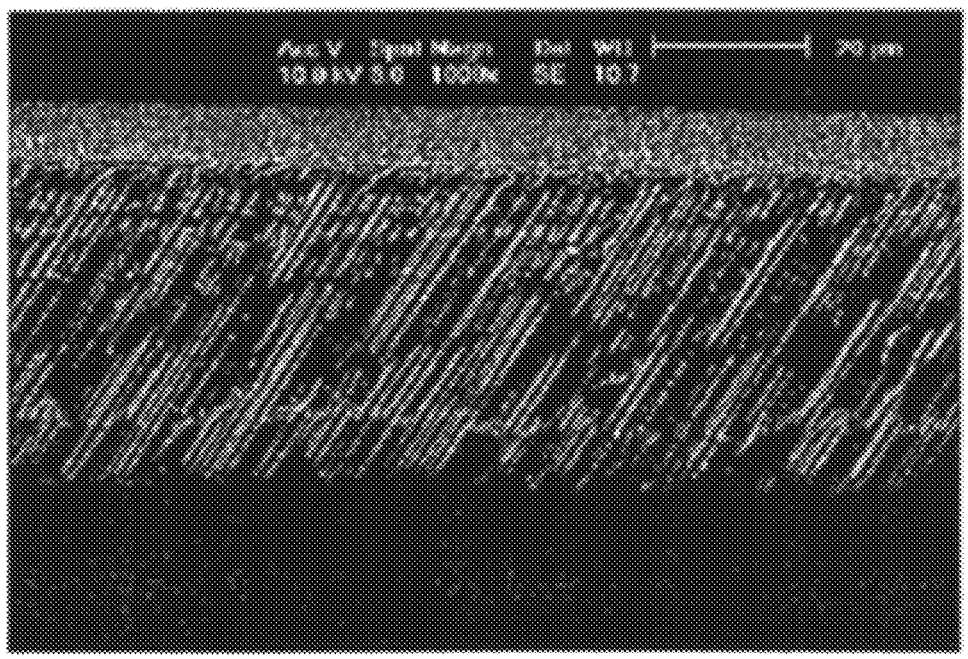
FIG. 6 illustrates a magnified side view of a porous silicon substrate useful as a support substrate in accordance with an embodiment of the present invention.

The present invention is directed to silicon electrode structures and silicon electrode assemblies associated with fuel cell systems, as well as to methods relating thereto. In this regard, it has been discovered that a silicon substrate (e.g. a silicon wafer) is a highly advantageous platform for fabricating electrode structures associated with fuel cell systems such as, for example, direct methanol fuel cell systems for portable electronic applications. Some of the advantages that a silicon platform provides include: (1) the ability to uniformly carry a catalyst on a surface or within a bulk fluid flow-through matrix, (2) the ability, when appropriately doped, to function as a current collector for the transmission of an electrical current, and (3) the ability to be selectively sculpted, metallized and processed into complicated structures via semiconductor micro-fabrication techniques.

Accordingly, an aspect of the present invention relates to the use of porous silicon as an electrode structure of a fuel cell system. In this regard, the novel porous silicon substrates (and/or support structures) of the present invention may be formed by silicon micro-machining and/or wet chemical techniques (employed by the semiconductor industry) such as, for example, anodic polarization of silicon in hydrofluoric acid. As is appreciated by those skilled in the art, the anodic polarization of silicon in hydrofluoric acid (HF) is a chemical dissolution technique and is generally referred to as HF anodic etching; this technique has been used in the semiconductor industry for wafer thinning, polishing, and the manufacture of thick porous silicon films. (See, e.g., Eijkel, et al., "A New Technology for Micromachining of Silicon: Dopant Selective HF Anodic Etching for the Realization of Low-Doped Monocrystalline Silicon Structures," *IEEE Electron Device Ltrs.,* 11(12):588–589 (1990)). In the context of the present invention, it is to be understood that the porous silicon may be nanoporous silicon (i.e., average pore size <2 nm), mesoporous silicon (i.e., average pore size of 2 nm to 50 nm), or macroporous silicon (i.e., average pore size >50 nm). In addition, the morphology of the porous silicon may be, for example, a branched and interconnecting network of mesoporous and/or macroporous acicular pores; alternatively, the porous silicon may have a "Kielovite" morphology.

More specifically, porous silicon substrates useful in the context of the present invention may be formed by a photoelectrochemical HF anodic etching technique, wherein selected oxidation-dissolution of silicon occurs under a controlled current density. (See, e.g., Levy-Clement et al., "Porous n-silicon Produced by Photoelectrochemical Etching," *Applied Surface Science,* 65/66:408–414 (1993); M. J. Eddowes, "Photoelectrochemical Etching of Three-Dimensional Structures in Silicon," *J. of Electrochem. Soc.,* 137(11):3514–3516 (1990).) An advantage of this relatively more sophisticated technique over others is that it is largely independent of the different principal crystallographic planes associated with single-crystal silicon wafers (whereas most anisotropic wet chemical etching methods have very significant differences in rates of etching along the different principal crystallographic planes). The photoelectrochemical HF anodic etching of n-type silicon, for example, depends upon, among other things, the existence of holes ($h^+$) at or near the silicon surface/solution interface. As is appreciated by those skilled in the art, such holes may be generated by illumination of the silicon surface (n-type); and the holes' transport or flux to the silicon/solution interface may be controlled by an applied potential bias (together with its associated electric field). Once at or near the silicon/solution interface, the photogenerated holes may take part in oxidation-reduction reactions with surface atoms. In a suitable electrolyte HF solution, oxidation-reduction will be followed by dissolution of the oxidation product such that etching will proceed. (Note that for p-type silicon, holes are readily available so there is generally no need for photo-illumination.) For purposes of enhanced clarity, FIGS. 1–7 show various porous silicon substrates that are useful as an electrode structure in accordance with certain embodiments of the present invention.

Several chemical oxidation-dissolution models have been reported to explain the reaction mechanism that occurs during the electrochemical HF anodic etching of silicon. Perhaps, the most popular model is the one proposed by Lehmann and Gosele. (Lehmann et al., "Porous Silicon Formation: A Quantum Wire Effect," *Applied Physics Letter*, 58(8)856–858 (1991)). The mechanism proposed by Lehmann and Gosele is schematically depicted below in chemical equation (4).

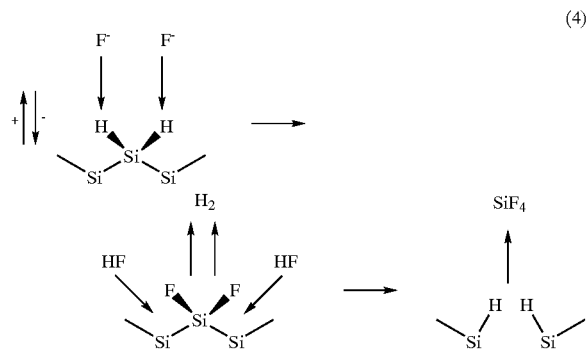

(4)

According to the Lehmann and Gosele model as represented by chemical equation (4), silicon, when immersed in a HF solution, will form a Si—H bond on the surface. The holes and their transport to or near the silicon surface/solution interface (caused by supplying a voltage together IR illumination for n-type silicon) reduces the strength of the Si—H bonds thereby allowing formation of Si—F$_2$, which, in turn, results in a weakening of the Si—Si bonds. Hydrofluoric acid form the solution then causes the weakened Si—Si bond to break, thereby causing the formation of SiF$_4$, which, in turn, goes into the surrounding solution.

In order to form porous silicon substrates by a photoelectrochemical HF anodic etching technique as described above, it is necessary to either obtain or construct an anodic etching cell. In this regard, a suitable anodic etching cell may be obtained commercially from Advanced Micromachining Tools GmbH (Frankenthal, Germany); alternatively, an appropriate anodic etching cell may be constructed.

Another aspect of the present invention relates to a silicon electrode structure that has been selectively doped so as to form one or more selectively doped regions, wherein each doped region is adapted to function as a current collector for the transmission of an electrical current. As is appreciated by those skilled in the art, silicon may be selectively doped (via appropriate masking of the silicon substrate) by high-temperature diffusion and/or ion implantation. However, because doping may adversely affect the HF anodic etching process (tends to mess up the pore morphology), it is preferable to selectively dope the silicon substrates of the present invention after the porous regions have been formed. In this way, the porous regions and surrounding interconnect channels may be made more conductive to electron transport, thereby facilitating electrical current removal and delivery to an outside source.

With respect to selective doping of the silicon substrates, boron may preferably be used as a p-type dopant whereas antimony, phosphorous, and arsenic may be used as n-type dopants. For example, boron has a high solubility in silicon and can achieve active surface concentrations as high as $4 \times 10^{20}/\text{cm}^3$. Elemental boron is inert up to temperatures exceeding the melting point of silicon. For high-temperature diffusion processes, a surface reaction with boron trioxide ($B_2O_3$) is used to introduce boron to the silicon surface.

$$2B_2O_3 + 3Si \rightleftharpoons 4B + 3SiO_2 \qquad (5)$$

In contrast, phosphorus has a higher solubility in silicon than does boron, and surface concentrations in the low $10^{21}/\text{cm}^3$ range can be achieved during high-temperature diffusion. For high-temperature diffusion, phosphorus is introduced into silicon through the reaction of phosphorus pentoxide at the silicon surface:

$$2P_2O_5 + 5Si \rightleftharpoons 4P + 5SiO_2 \qquad (6)$$

Unlike high-temperature diffusion, ion implantation uses a high-voltage accelerator to introduce impurity atoms into the surface of a silicon substrate. Because ion implantation is a low-temperature process, it permits the use of a wide variety of materials as barrier layers to mask implantation (e.g., photoresist, oxide, nitride, aluminum, and other metal films may all be used). In addition, ion implantation allows for tighter control of the dose introduced into the silicon substrate, and a much wider range of doses may be reproducibly achieved than is possible with high-temperature. For these reasons, the doped silicon substrates of the present invention are preferably made selectively more conductive by ion implantation.

Still another aspect of the present invention relates to a metallic catalyst carried on the novel silicon electrode structures disclosed herein, wherein the catalyst facilitates oxidation-reduction reactions of a fuel (e.g., hydrogen or methanol) or an oxidant (e.g., oxygen from the air). In this regard, it is to be understood that the catalyst may be carried on the surface or face of a silicon substrate; and/or the catalyst may be carried on the pore surfaces (i.e., within the bulk matrix of the substrate or support structure) of a porous silicon substrate (wherein the pore surfaces are also referred to herein as active regions).

Unlike traditional electrocatalyst deposition methods such as, for example, electroplating, sputtering and metal evaporation (which methods have all been used in conjunction with known fuel cell electrode structures to form catalytic films or layers that are substantially planar in character), the metallic catalyst aspect contemplates the use of novel surface organometallic chemistry techniques to form a metallic and/or bimetallic catalyst dispersions on and/or within a silicon support structure (see, e.g., FIG. 7). The formation of such a metallic and/or bimetallic catalyst dispersion by the use of surface organometallic chemistry techniques provides for an extremely efficient use of the catalyst (thereby resulting in significant cost savings), and allows for uniform dispersion of the catalyst throughout the bulk matrix of the substrate and/or support structure (thereby enhancing the oxidation-reactions occurring thereon).

In the context of direct methanol fuel cells, for example, it is known that platinum provides one of the best surfaces for the dissociative adsorption of methanol. However, at potentials required for methanol electrooxidation, the —C≡O intermediates formed during the complete oxidation process are relatively stable on the surface, and as a result they tend to poison the catalyst by blocking the adsorption sites. This tendency may be avoided, to some extent, by the addition of certain other metal additives so as to decrease the stability of the —C≡O on the surface (and in so doing, it is believed that such metal additives may facilitate the overall oxidation-reduction process). Thus, several mixed metal catalysts may be used (i.e., combinations of one or more noble metals) and are thus considered to be within the scope of the present invention; however, a bimetallic platinum:ruthenium catalyst is a particularly active bi-metallic catalyst and is therefore preferred (at least with respect to the anode).

As is appreciated by those skilled in the art, the reaction of selected organometallic precursors with exposed surface atoms is one way to deposit or chemisorb a metallic catalyst. For example, the surface of a silicon substrate (including its pore surfaces) may be oxidized by exposure to air and water vapor at slightly elevated temperatures, thereby causing the surface to be covered with hydroxyl groups (Si—OH). These surface hydroxyl groups are active sites, and therefore may be used as the starting point for chemisorbing catalysts thereon via surface organometallic chemistry techniques. For example, the reaction of selected organometallic precursors with surface hydroxyl groups causes the chemisorption of surface supported molecular analogues thereof, which upon reduction gives rise to chemisorbed metallic nanoparticles having very small size distributions. Such methodologies are well suited for deposition onto and into the various silicon support structures disclosed herein. For purposes of clarity, the terms "chemisorb" and "chemisorption" are to have meanings as understood by those skilled in the art of surface organometallic chemistry; and as such, these terms refer to molecules held to a surface by forces of the same general type as those occurring between bound atoms in molecules. Moreover, the heat evolved per mole of chemisorbed material is usually comparable to that evolved in chemical bonding, namely, about 100–500 kJ. (Laidler et al., "Physical Chemistry," *Benjamin/Cummings Publishing Company, Inc.* (1982).)

In an exemplary aspect of the present invention, a non-contiguous bi-metallic layer of platinum and ruthenium may be chemisorbed on and/or within a nonporous/porous silicon substrate by selective use of platinum and ruthenium precursors. For example, a silicon substrate may be immersed, under basic conditions (pH 8.5), into an aqueous ammonia solution of tetraamineplatinum(II) hydroxide hydrate, [Pt(NH$_3$)$_4$](OH)$_2$-xH$_2$O, (commercially available from Strem Chemicals, Inc., Newburyport, Me.) and stirred for a selected period of time, thereby causing formation of a platinum complex in accordance with chemical equation (8):

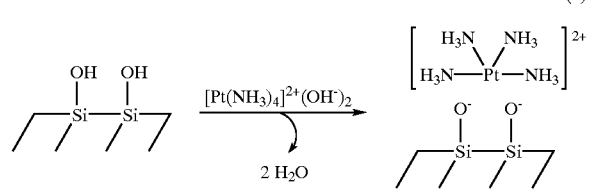

(8)

After washing with cold water, the silicon substrate may then be calcined in air to remove the remainder of the ligands from the platinum. This step may be done under a slow temperature ramp, 25–400° C., over a selected period of time, as is shown in chemical equation (9).

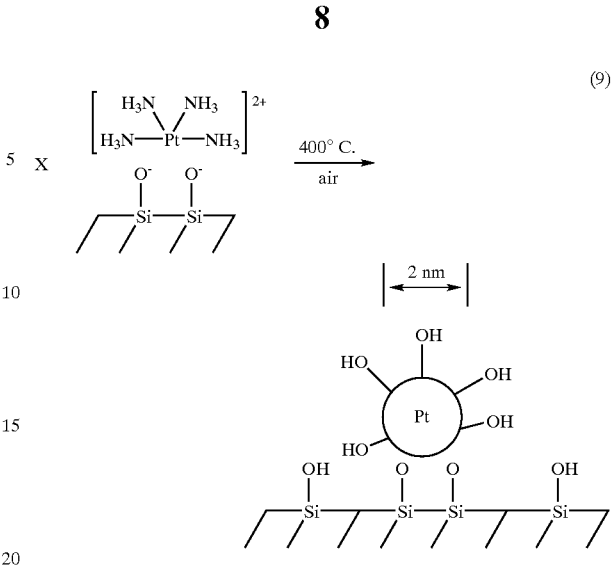

(9)

In general, the slower the temperature is increased, the smaller the size of the chemisorbed platinum particles (i.e., greater surface area, and narrower size distribution). (Humblot et al., "Surface Organometallic Chemistry on Metals: Formation of a Stable Sn(n-C4H9) Fragment as a Precursor of Surface Alloy Obtained by Stepwise Hydrogenolysis of Sn(n-C4H9)(4) on a Platinum Particle Supported on Silica," *J. Am. Chem. Soc.*, 120(1):137–146 (1998); and Humblot et al., "Surface Organometallic Chemistry on Metals: Selective Dehydrogenation of Isobutane into Isobutene on Bimetallic Catalysts Prepared by Reaction of Tetra-n-Butyltin on Silica-Supported Platinum Catalyst," *J. Catal.*, 179(2):458–468 (1998).).

Next, and after the silicon substrate has reached room temperature, it may then be immersed, under basic conditions (pH 8.5), into an aqueous ammonia solution of hexamineruthenium(III) chloride, [Ru(NH$_3$)$_6$]Cl$_3$ (commercially available from Strem Chemicals, Inc., Newburyport, Me.), and stirred for a selected period of time, thereby causing formation of a ruthenium complex in accordance with chemical equation (10).

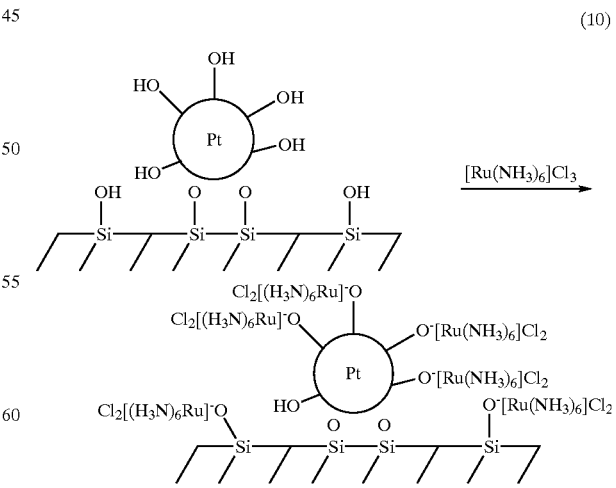

(10)

Finally, the catalyst may be reduced under flowing H$_2$ at 400° C. (1% in nitrogen) to form a mixed platinum ruthenium catalyst in accordance with chemical equation (11).

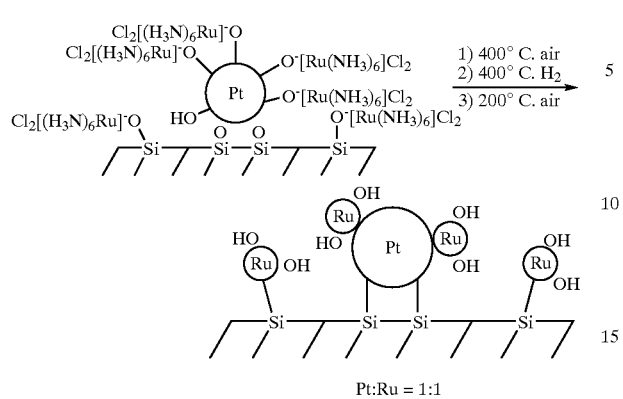

Pt:Ru = 1:1 (11)

For purposes of illustration and not limitation, the following examples more specifically disclose various aspects of the present invention.

EXAMPLES

Example 1

Silicon Substrate Electrodes

This example discloses the processing steps associated with making a silicon-based electrode adapted for use with a fuel cell system in accordance with an embodiment of the present invention In this example, the processing steps consist essentially of (1) the anode fabrication steps, and (2) the cathode fabrication steps. Without limitation, the principal processing steps are set forth below and with reference to FIGS. 8 to 37 and FIGS. 39 to 64.

Figure 9:
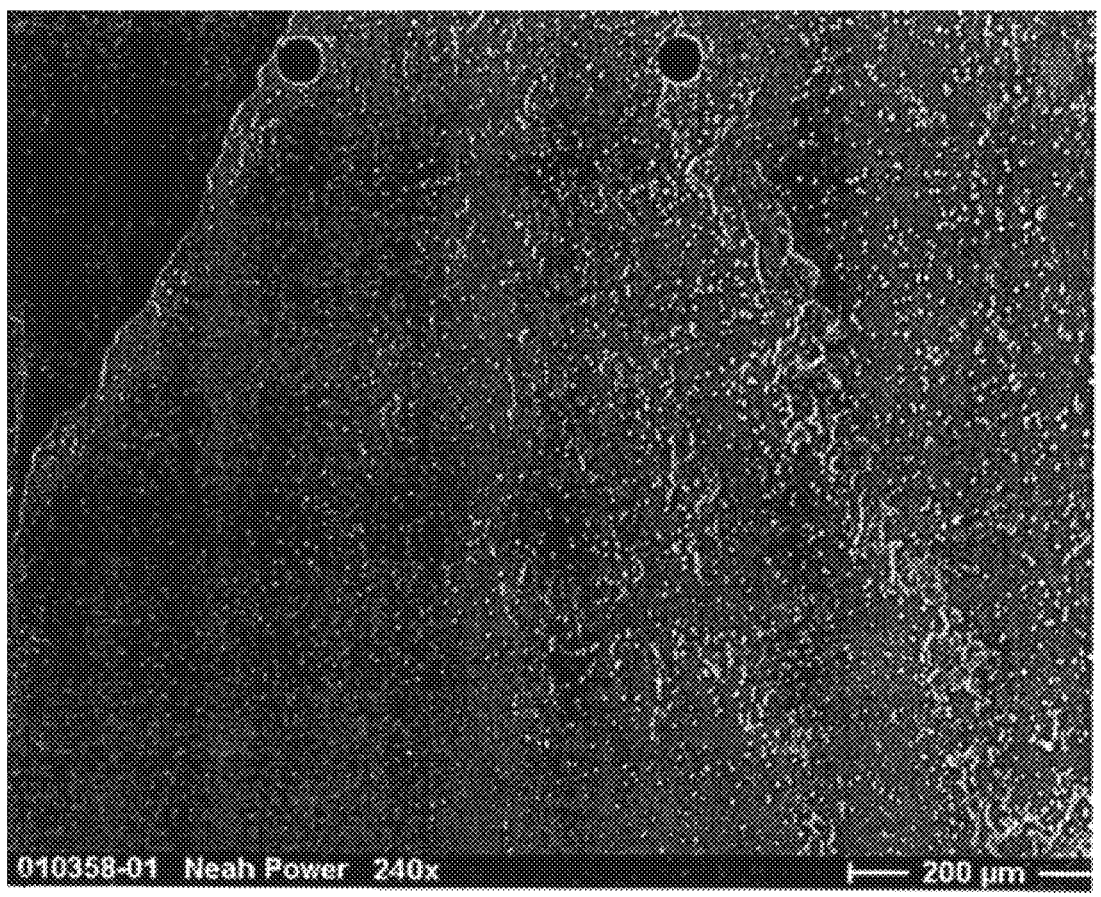
Figure 8:
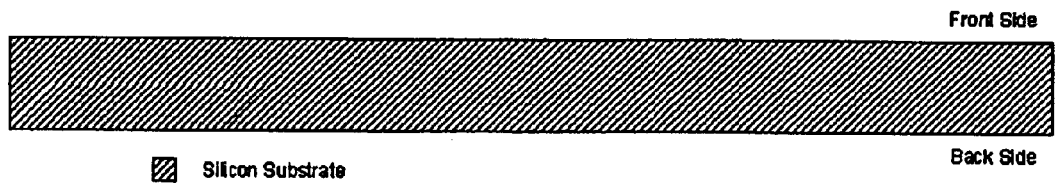
Figure 9:
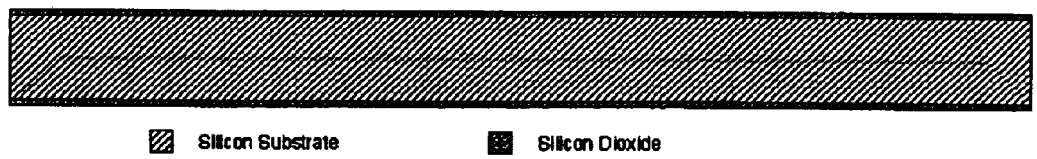

ANODE FABRICATION—Start with a silicon substrate having the following characteristics: 400 $\mu$m double side polished, (100) crystal orientation, 0.005 to 0.10 $\Omega$-cm, n-type, 100 mm diameter (refer to FIG. 8), and process in accordance with the following steps:

1.1 Deposit a 5000 Å+/−5% layer of silicon dioxide (dielectric) on the front and backside of the silicon substrate via wet thermal oxidation (refer to FIG. 9).

Figure 10:
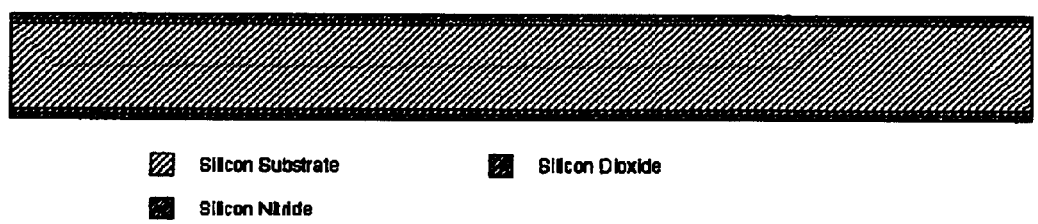

1.2 Deposit 600 Å+/−5% of silicon nitride (dielectric) on the front and backside of the silicon substrate via LPCVD nitride deposition (refer to FIG. 10).

Figure 11A:
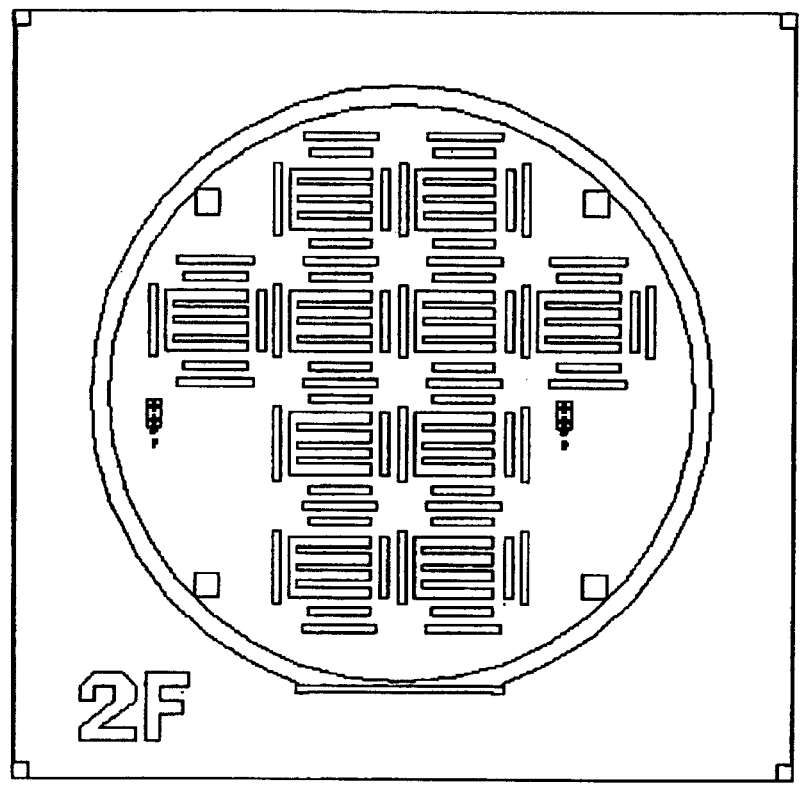
Figure 11B:
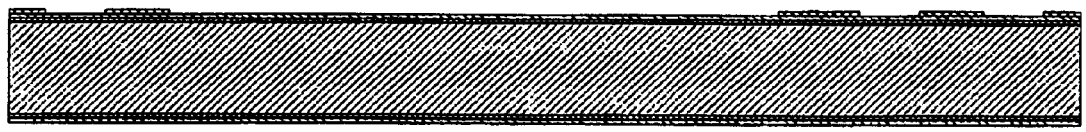

1.3 Deposit photoresist patterned from Mask A1-1F on the front side of the silicon substrate—the openings only expose the fuel and oxidant inlet/outlets, the dicing lanes, and the flow channels (refer to FIGS. 11A and 11B).

Figure 12:

1.4 RIE both dielectrics on the front side of the silicon substrate (refer to FIG. 12).

Figure 13:

1.5 Strip the photoresists from the front side of the silicon substrate (refer to FIG. 13).

Figure 14A:
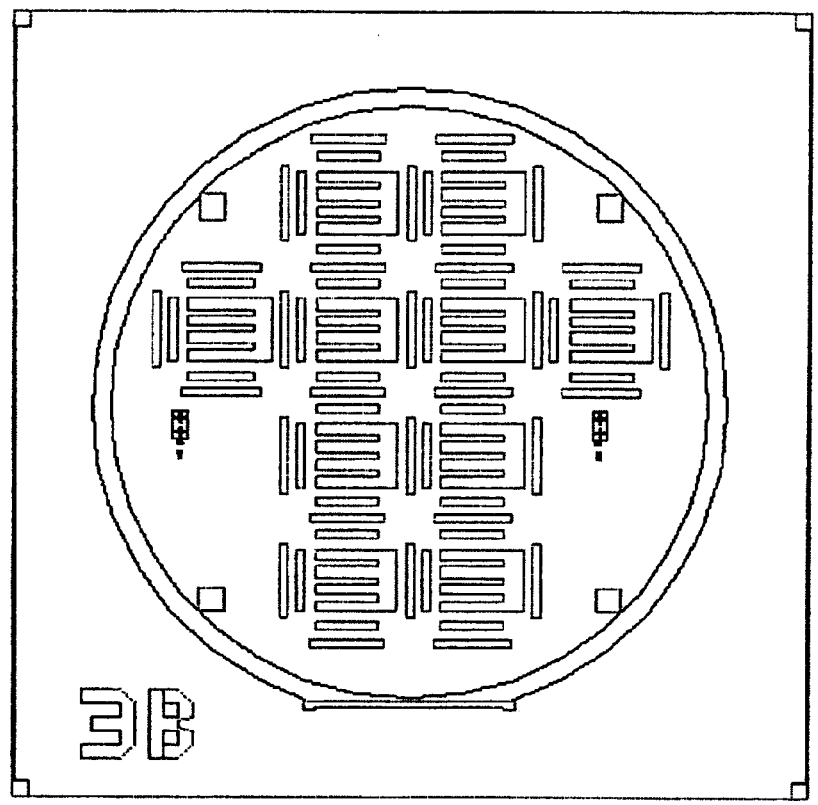
Figure 14B:
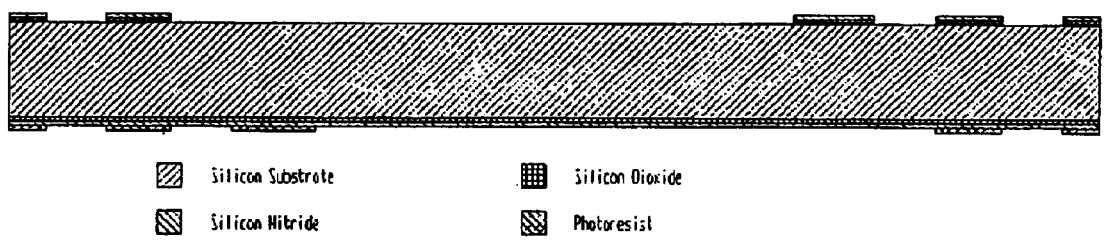

1.6 Deposit photoresist patterned from Mask A1-2B on the backside of the silicon substrate—the openings only expose the fuel and oxidant inlet/outlets, the dicing lanes, and the flow channels (refer to FIGS. 14A and 14B).

Figure 15:
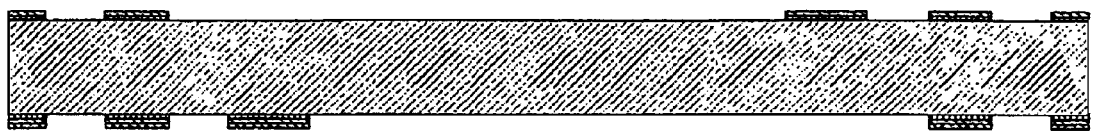

1.7 RIE both dielectrics from the backside of the silicon substrate (refer to FIG. 15).

Figure 16:
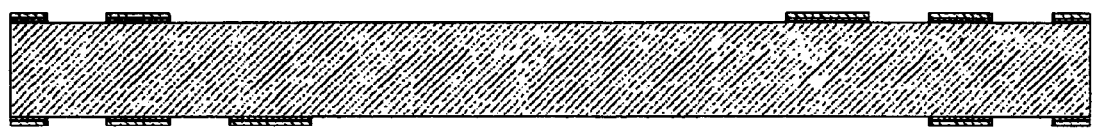

1.8 Strip photoresist from the backside of the silicon substrate (refer to FIG. 16).

Figure 17:
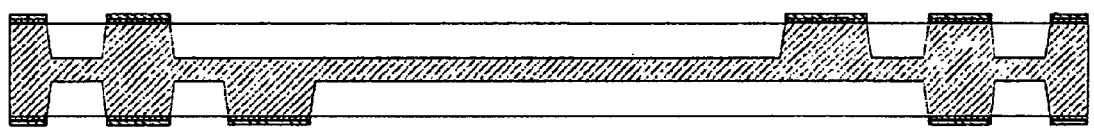

1.9 KOH etch 150 $\mu$m from the front and backside of the silicon substrate—carve out the fuel and oxidant inlet/outlets, the dicing lanes, and the flow channels (refer to FIG. 17).

Figure 18:

1.10 Sputter 200 Å of Ti—W followed by an additional 5000 Å of Au on the front side of the silicon substrate—for the anodic etching Ohmic contact (refer to FIG. 18).

Figure 19A:
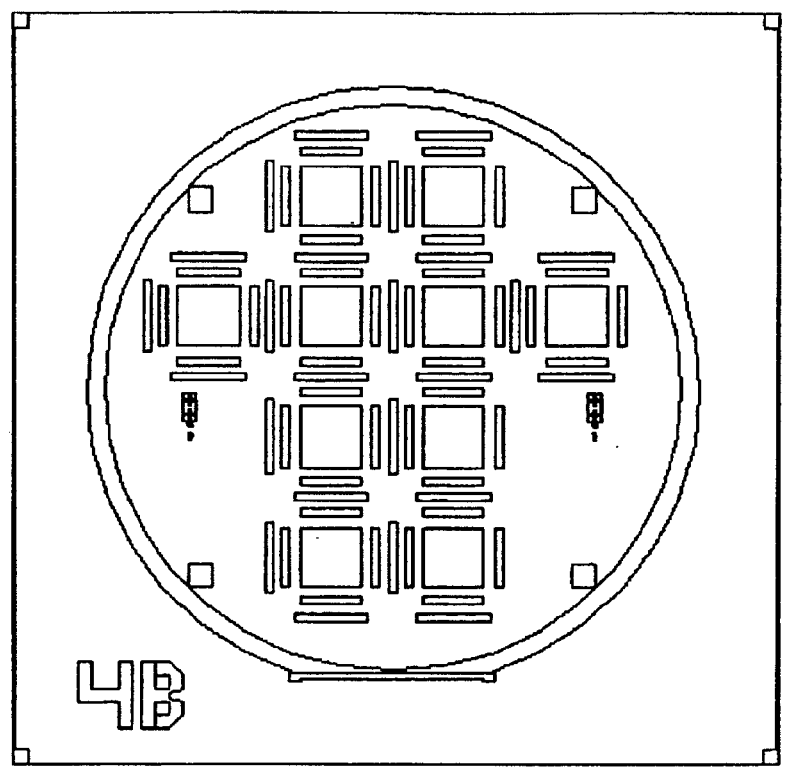
Figure 19B:
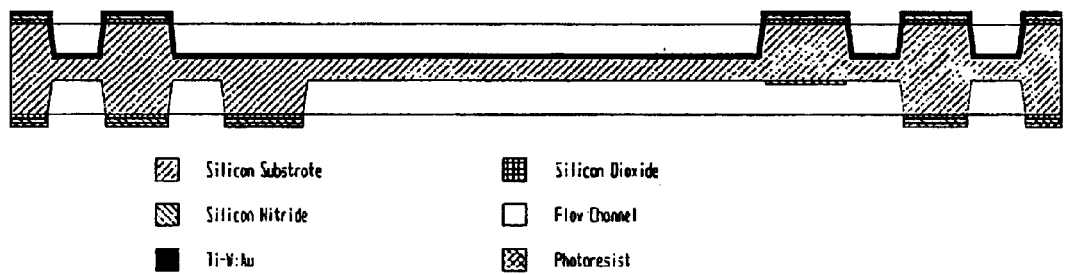

1.11 Deposit photoresist patterned from Mask A1-3B on the backside of the silicon substrate—the openings only expose the fuel and oxidant inlet/outlets, the dicing lanes, and the "active" regions to anodic etching (refer to FIGS. 19A and 19B).

Figure 20:
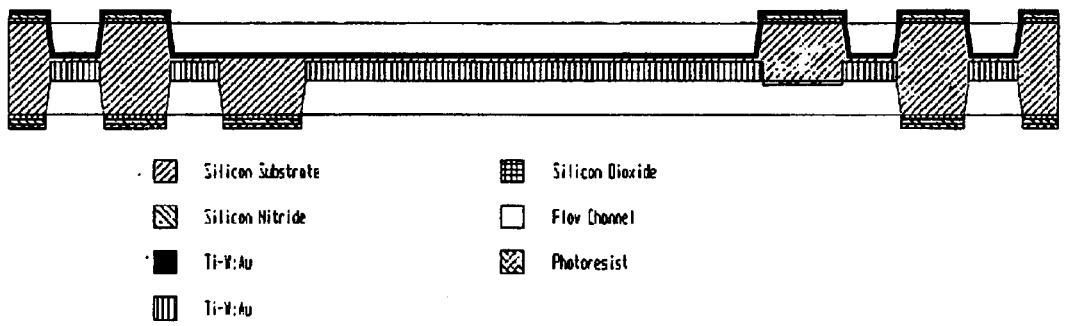

1.12 Anodic etch the silicon substrate—creating a 200 $\mu$m porous silicon layer (refer to FIG. 20).

Figure 21A:
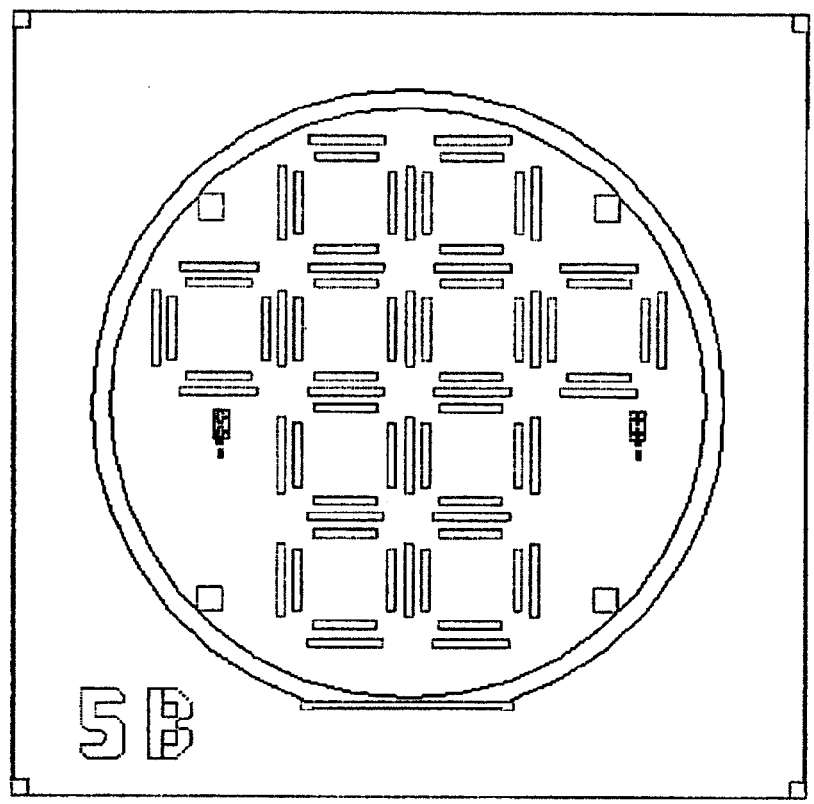
Figure 21B:
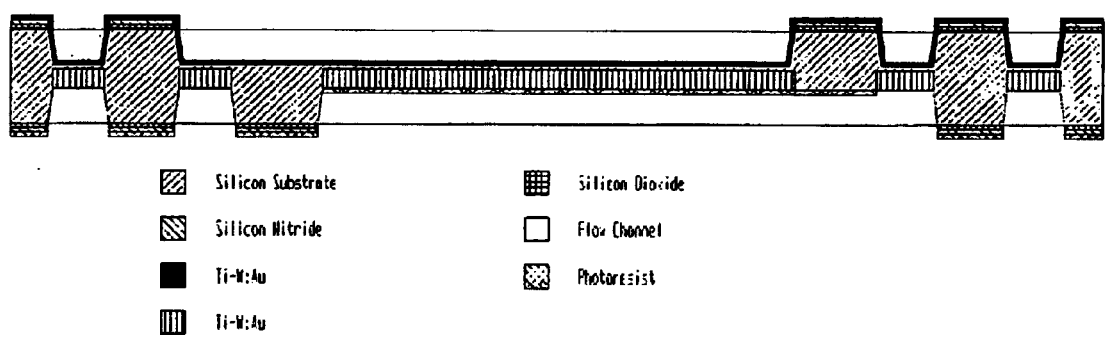

1.13 Deposit photoresist patterned from Masks A1-4B on the backside of the silicon substrate—the openings only expose the fuel and oxidant inlet/outlets and the dicing lanes (refer to FIGS. 21A and 21B).

1.14 KOH etch out the porous silicon on the inlet/outlet plus electrical channels from the backside of the silicon substrate (quickly)—remove the porous silicon within the fuel and oxidant inlet/outlets and the dicing lanes (refer to FIG. 22).

1.15 Strip photoresist from the backside of the silicon substrate (refer to FIG. 23).

1.16 Remove the Ohmic contact for anodic etching from the front side of the silicon substrate (refer to FIG. 24).

Figure 25A:
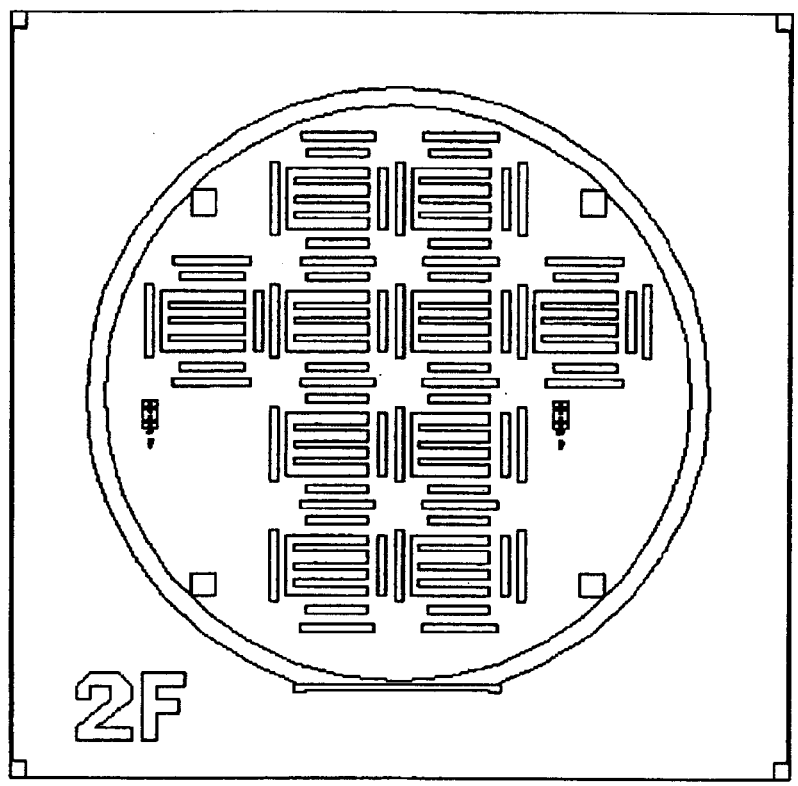
Figure 25B:
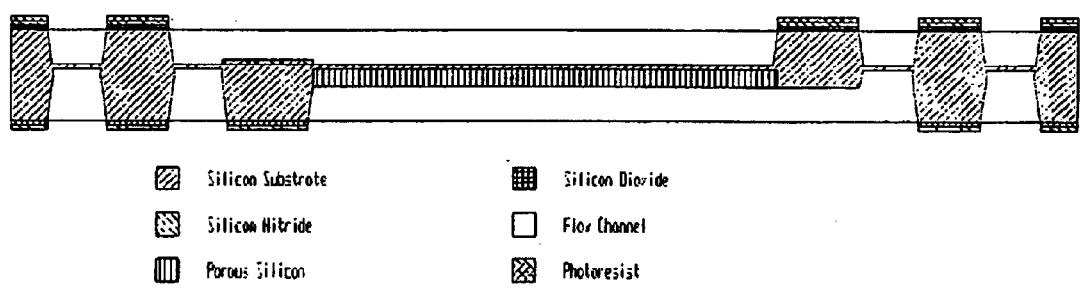

1.17 Deposit photoresist patterned from Mask A1-1F (reused) on the front side of the silicon substrate—the openings only expose the fuel and oxidant inlet/outlets, the dicing lanes, and the flow channels (refer to FIGS. 25A and 25B).

Figure 26:
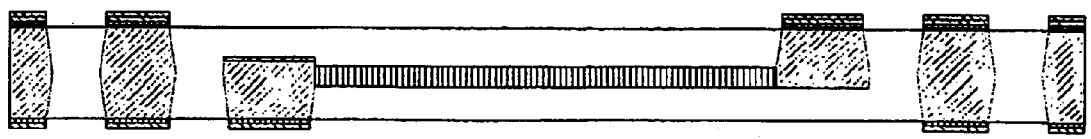

1.18 RIE the remaining silicon material within the fuel and oxidant inlet/outlets and the dicing lanes from the front side of the silicon substrate (refer to FIG. 26).

Figure 27:
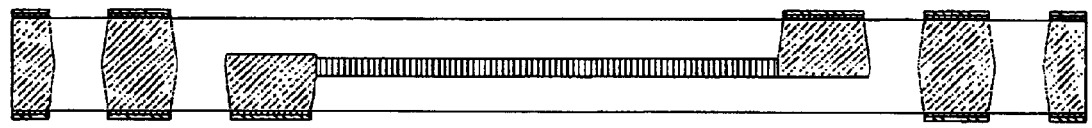

1.19 Strip photoresist from the front side of the silicon wafer (refer to FIG. 27).

1.20 Selectively diffusion dope the porous silicon with phosphorous—to make the porous silicon conductive, approximately 50 m$\Omega$-cm.

Figure 28A:
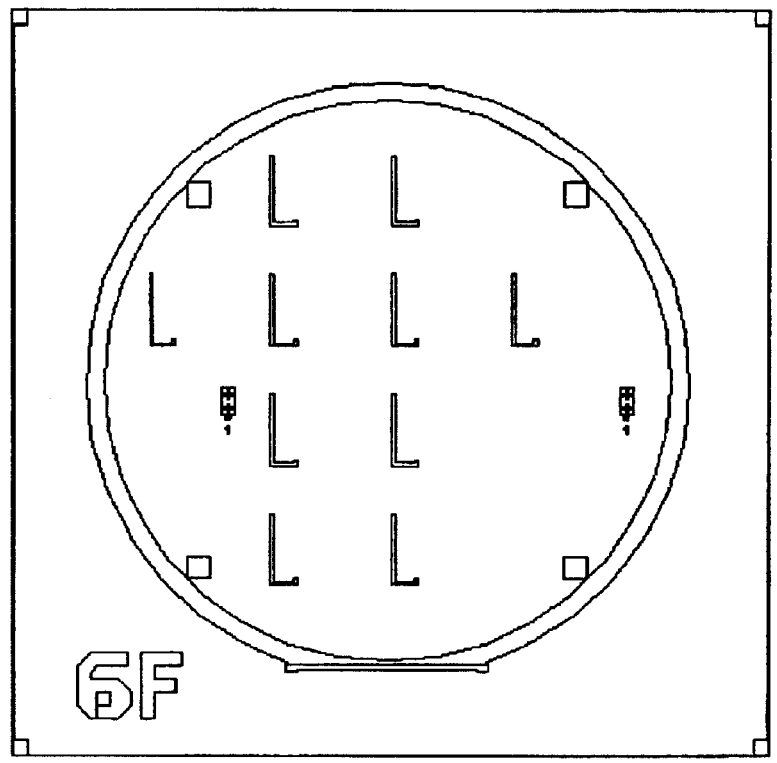
Figure 28B:
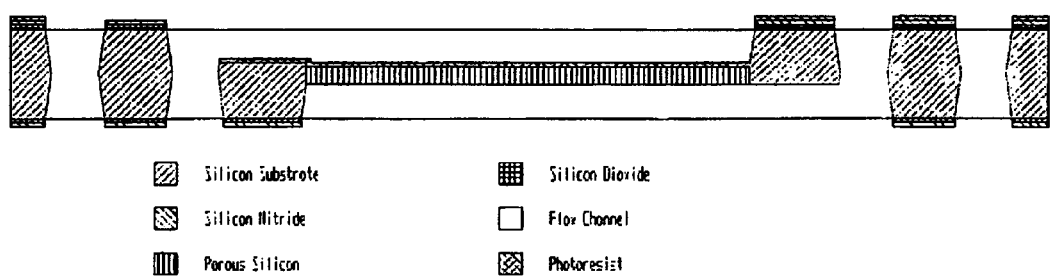

1.21 Deposit photoresist patterned from Mask A1-5F on the front side of the silicon substrate—the openings only expose the area for the electrical contacts between the porous silicon and the dicing lanes (refer to FIGS. 28A and 28B).

Figure 29:
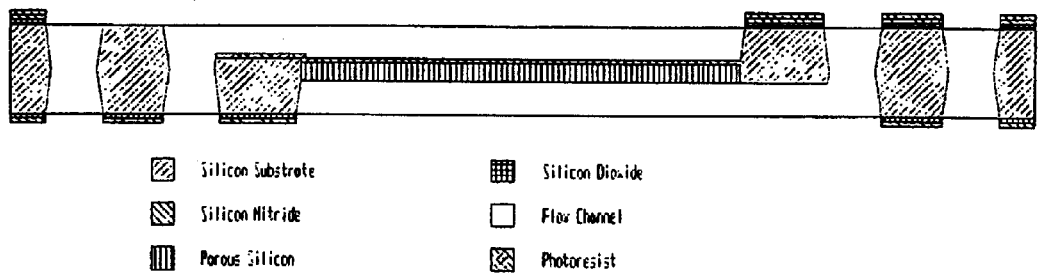

1.22 RIE both dielectrics from the front side of the silicon substrate (refer to FIG. 29).

Figure 30:
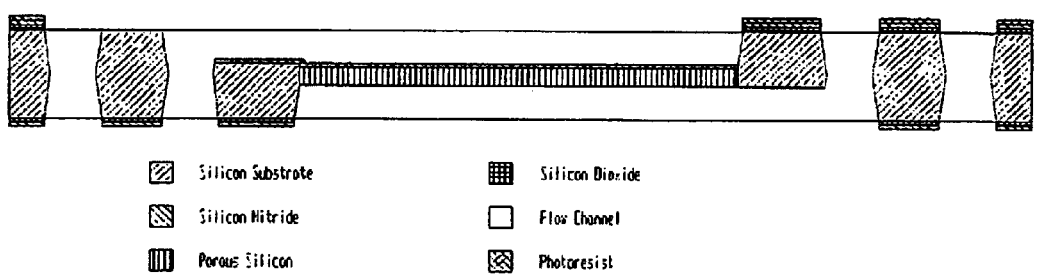

1.23 Strip photoresists from the front side of the silicon substrate (refer to FIG. 30).

Figure 31:
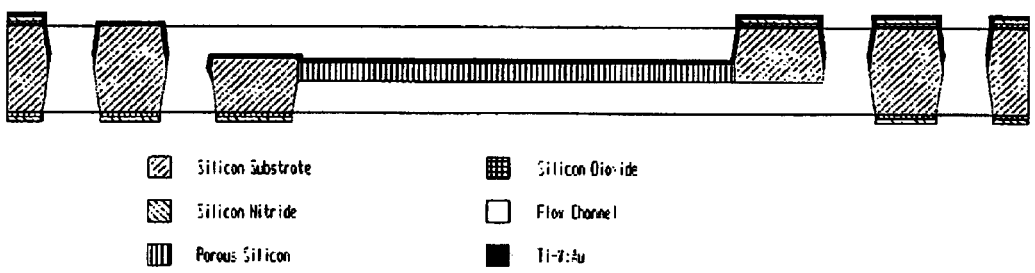

1.24 Sputter 200 Å Ti—W followed by an additional 4,800 Å Au on the front side of the silicon substrate—for the electrical contacts between the porous silicon and the dicing lanes (refer to FIG. 31).

1.25 Deposit photoresist patterned from Mask A1-6F on the front side of the silicon substrate—the photoresist covers the sputtered metal located on the front side of the substrate for negative metal lift off (refer to FIGS. 32A and 32B).

Figure 33:
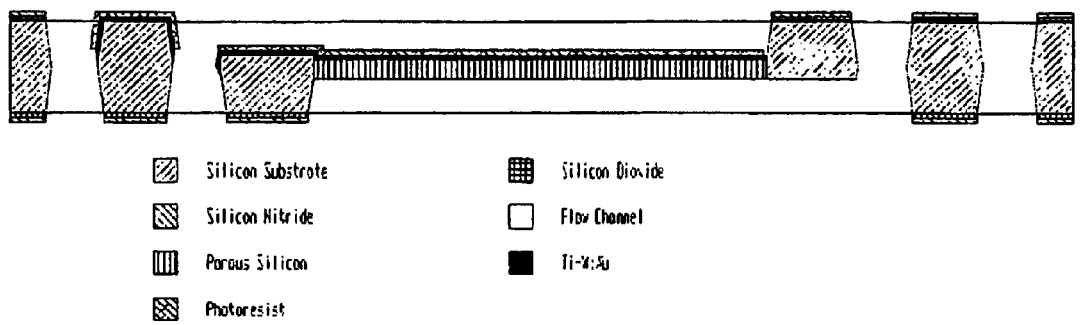

1.26 Etch Au and Etch Ti—W from the front side of the silicon substrate (refer to FIG. 33).

Figure 34:
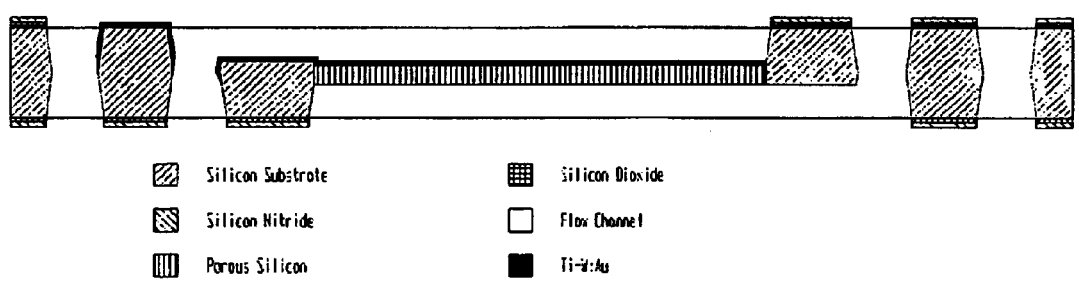

1.27 Strip the photoresists from the front side of the silicon substrate (refer to FIG. 34).

Figure 35:
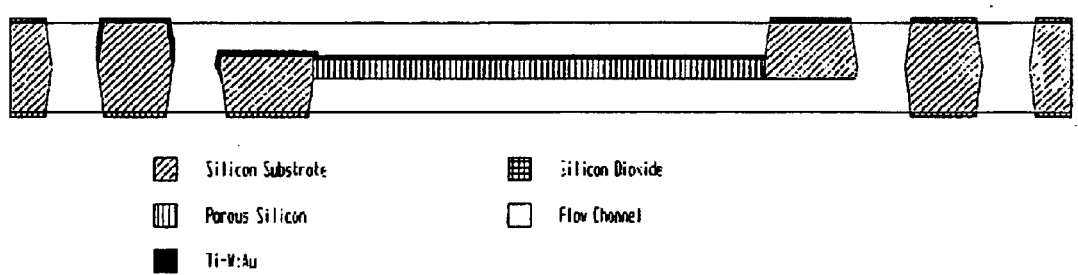

1.28 Remove the silicon nitride via RIE on both the front and backside of the silicon substrate (refer to FIG. 35).

Figure 36:
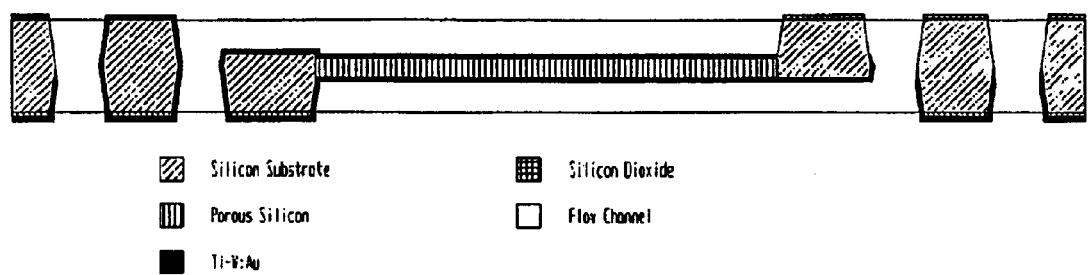
Figure 37:
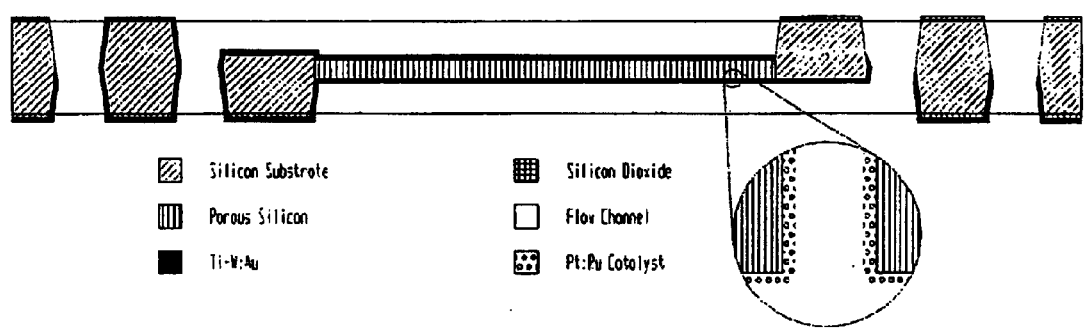

1.29 Evaporate 500 Å of Ti—W followed by 2 $\mu$m of Au onto the backside of the silicon substrate (refer to FIG. 36).

1.30 Catalyst Deposition & Preparation: (a) Heat the silicon substrate to 200° C. in air for 2 hours; (b) After the silicon substrate has cooled to RT, place silicon wafer in an aqueous ammonia solution of tetraamineplatinum(II) hydroxide hydrate, [Pt(NH$_3$)$_4$](OH)$_2$-xH$_2$O, at pH 8.5 and stir for 10 hours. The solution will contain enough platinum complex to deposit a maximum of 2% weight platinum on silicon, i.e., a 100 mg wafer will be placed in a bath containing 2 mg of platinum (3.4 mg tetraamineplatinum(II) hydroxide hydrate); (c) Remove the silicon wafer from the aqueous ammonia solution and dry in vacuo for 1 hour; (d) Heat silicon substrate under a flow of oxygen/nitrogen (20:80) from RT to 400° C. at a rate of 2° C. per minute, approximately 3 hours, and then hold at 400° C. for 1 hour; (e) After the silicon wafer has cooled to RT, placed silicon wafer in an aqueous ammonia solution of hexamineruthenium(III) chloride, [Ru(NH$_3$)$_6$]Cl$_3$, at pH 8.5 and stir for 10 hours. The solution will contain enough ruthenium complex to deposit a maximum of 1.5% weight ruthenium on silicon, i.e., a 100 mg wafer will be placed in a bath containing 1.5 mg ruthenium (4.6 mg hexamineruthenium(III) chloride); (f) Remove the silicon wafer from the aqueous ammonia solution and dry in vacuo for 1 hour; (g) Heat silicon substrate under a flow of oxygen/nitrogen (20:80) from RT to 400° C. at a rate of 2° C. per minute, approximately 3 hours, and then hold at 400° C. for 1 hour; (h) Heat the silicon wafer under flowing hydrogen. The temperature should be rapidly increased from RT to 400° C. at a rate of 25° C. per minute, approximately 15 minutes, and held at 400° C. for 4 hours (refer to FIG. 37).

Figure 38A:
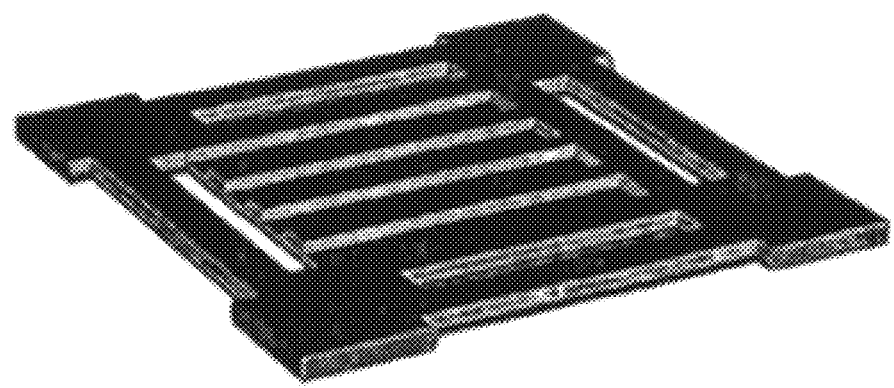
FIGS. 38A and 38B illustrates top isometric views of a silicon anode structure in accordance with an embodiment of the present invention.
Figure 38B:
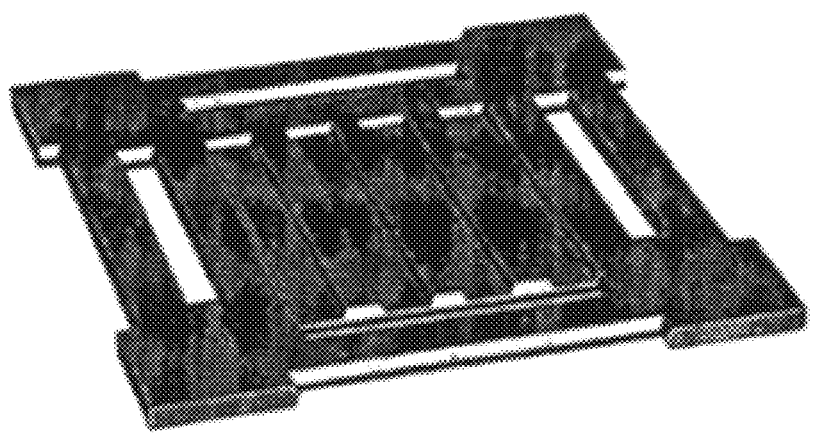
Figure 39:
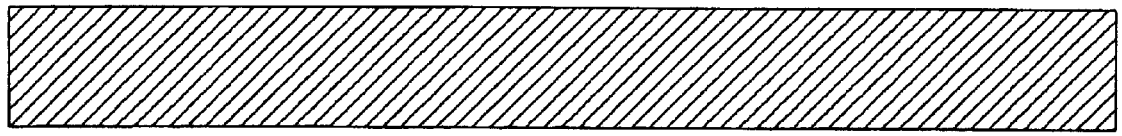

The completed anode structure manufactured in accordance with the above processing steps is illustrated in FIGS. 38A and 38B, respectively.

Figure 40:
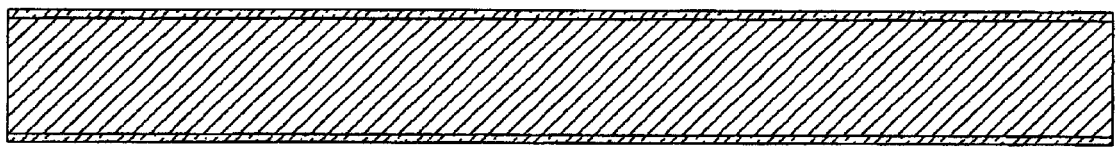

CATHODE FABRICATION—Start with a silicon substrate having the following characteristics: 400 μm double side polished, (100) crystal orientation, to 1.0 Ω-cm, n-type, 100 mm diameter (refer to FIG. 39), and process in accordance with the following steps:

2.1 Deposit a 1000 Å+/−5% layer of Stoichiometric silicon nitride on the front and backside of the silicon substrate via LPCVD nitride deposition (refer to FIG. 40).

2.2 Deposit photoresist patterned from mask C1-1B on the backside of the silicon substrate—to initially open inlet and outlet ports (refer to FIGS. 41A and 41B).

Figure 42:
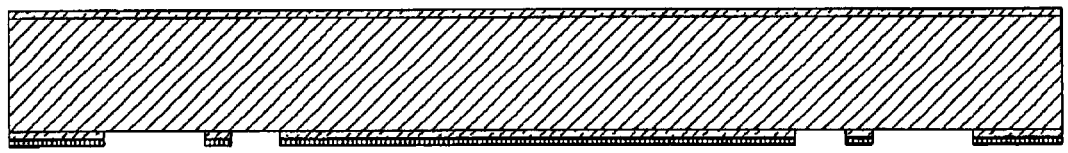

2.3 RIE silicon nitride on the silicon substrate backside (refer to FIG. 42).

Figure 43:
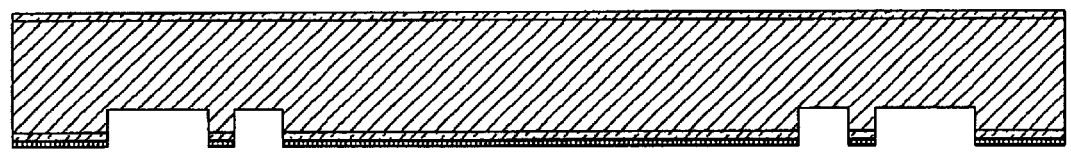

2.4 Isotropic or DRIE of 60-micron depth cavities from the backside of the silicon substrate—for the fuel and oxidant inlet/outlets and dicing lanes (refer to FIG. 43).

Figure 44:
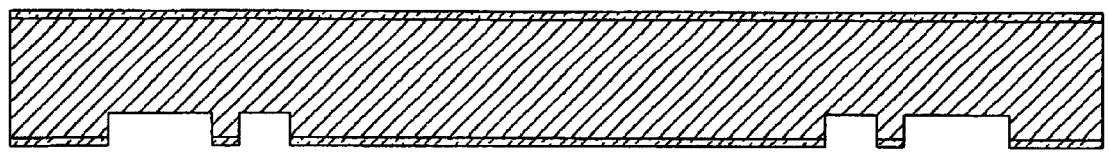

2.5 Strip the photoresists off the backside of the silicon substrate (refer to FIG. 44).

Figure 45:
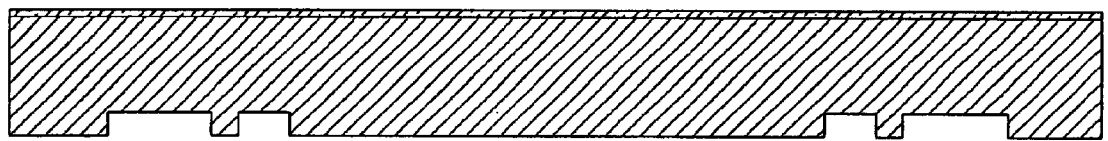

2.6 Remove all nitride on the backside of the silicon substrate by RIE (this fabrication step can be disregarded depending on stacking requirements) (refer to FIG. 45).

Figure 46:
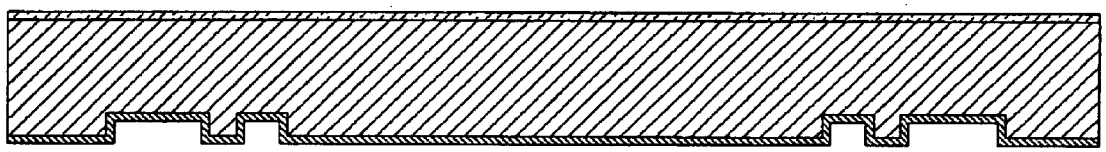

2.7 Sputter or evaporate 1 μm of aluminum on the backside of the silicon substrate—the aluminum will serve as an Ohmic contact for anodic etching (refer to FIG. 46).

Figure 47A:
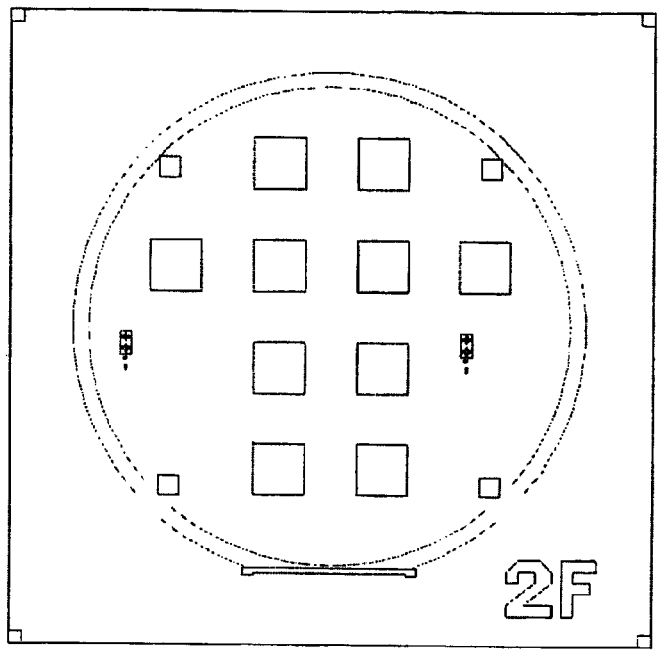
Figure 47B:
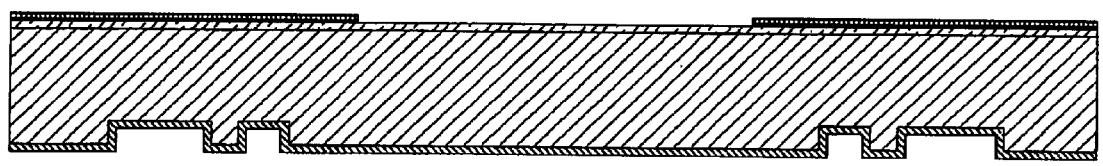

2.8 Deposit photoresist patterned from Mask C1-2F on the front side of the silicon substrate—to open regions on the substrate for porous silicon etching (refer to FIGS. 47A and 47B).

Figure 48:
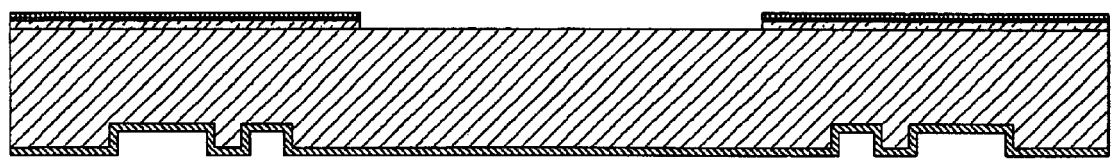

2.9 RIE silicon nitride on the silicon substrate front side (refer to FIG. 48).

Figure 49:
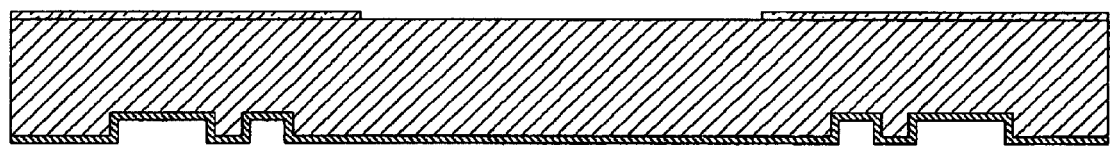

2.10 Strip the photoresists from the front side of the silicon substrate (refer to FIG. 49).

Figure 50:
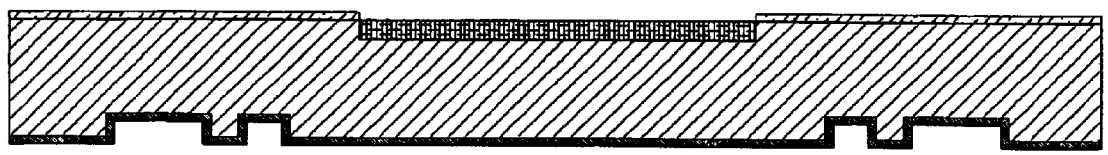

2.11 Anodic etch the silicon substrate—creating 50 μm porous silicon layer (refer to FIG. 50).

Figure 51:
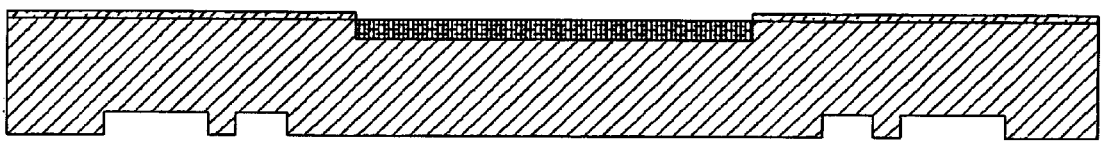

2.12 Strip off aluminum contact from the backside of the silicon substrate (refer to FIG. 51).

2.13 Selectively dope the porous silicon with phosphorus—to make the porous silicon conductive, approximately 50 mΩ-cm.

2.14 Anneal substrate to in N$_2$—to drive in dopant and relieve stress inside the silicon substrate.

Figure 52:
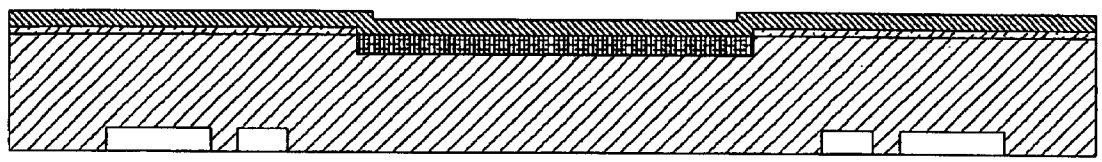

2.15 Sputter or evaporate 1 to 3 μm of aluminum on the front side of the silicon substrate—the aluminum serves as a thermal conductive layer for DRIE (refer to FIG. 52).

Figure 53A:
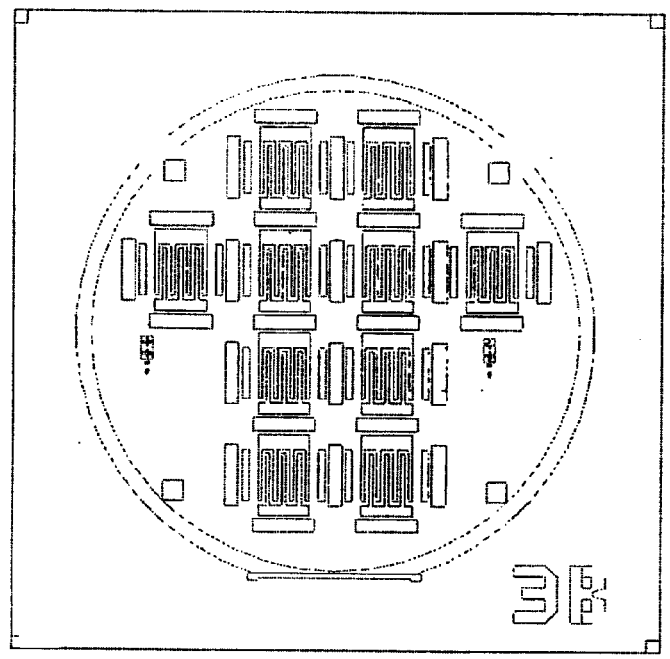
Figure 53B:
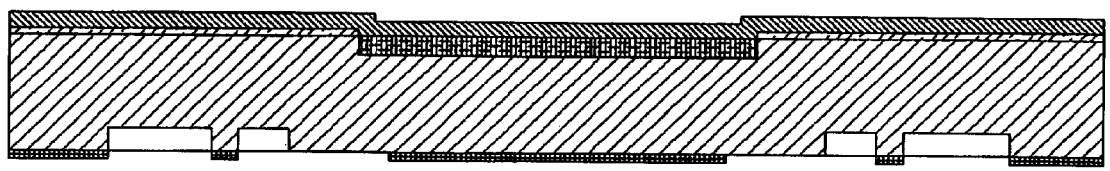

2.16 Deposit photoresists patterned from mask C1-3B on the backside of the silicon substrate—to initially open inlet, outlet ports and porous silicon for DRIE, AZ4620, 12 μm (refer to FIGS. 53A and 53B).

Figure 54:
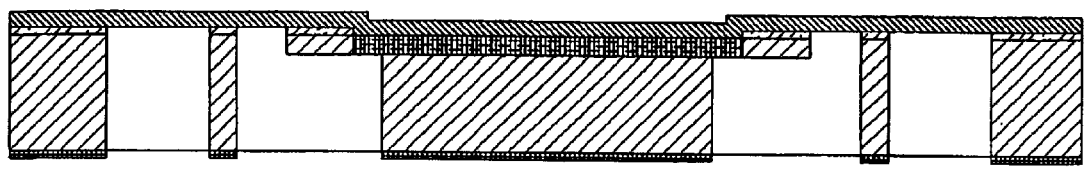

2.17 Deep Reactive Ion Etching on the backside of the silicon substrate—anisotropic etching i.e., Bosch Etch (refer to FIG. 54).

Figure 55:
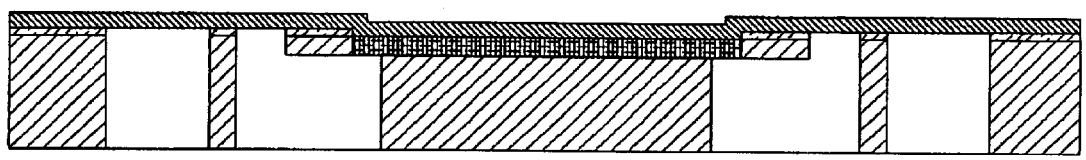

2.18 Strip the photoresists off the backside of the silicon substrate (refer to FIG. 55).

Figure 56:
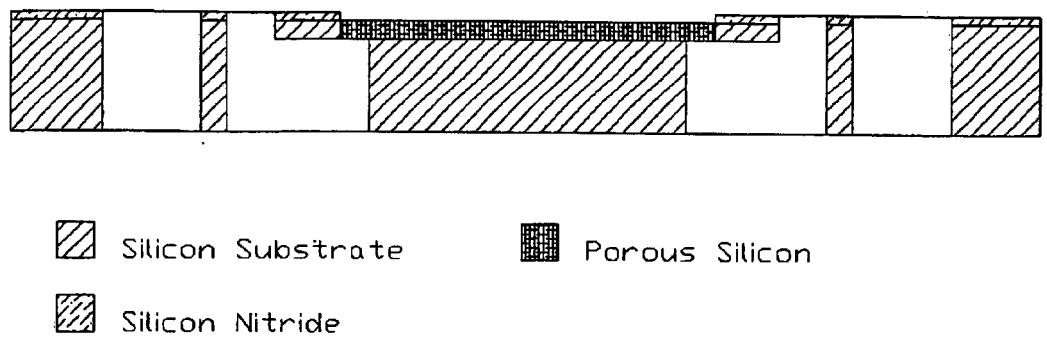

2.19 Strip off aluminum contact from the front side of the silicon substrate (refer to FIG. 56).

Figure 57:
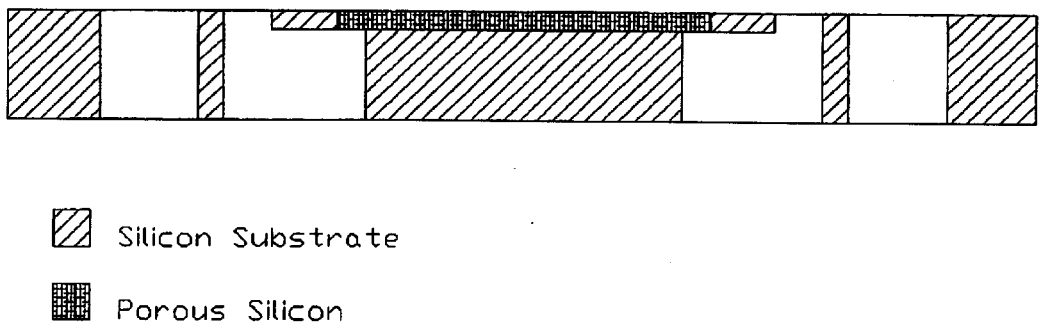

2.20 Remove silicon nitride from the front side of the silicon substrate via RIE (refer to FIG. 57).

Figure 58:
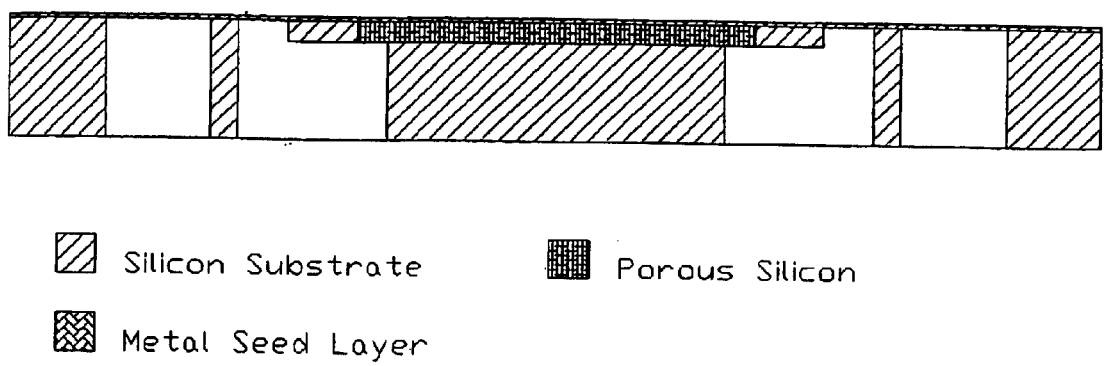

2.21 Sputter a seed layer of palladium on the front side of the silicon substrate—to be used to electroplate palladium for MeOH blocker (refer to FIG. 58).

Figure 59A:
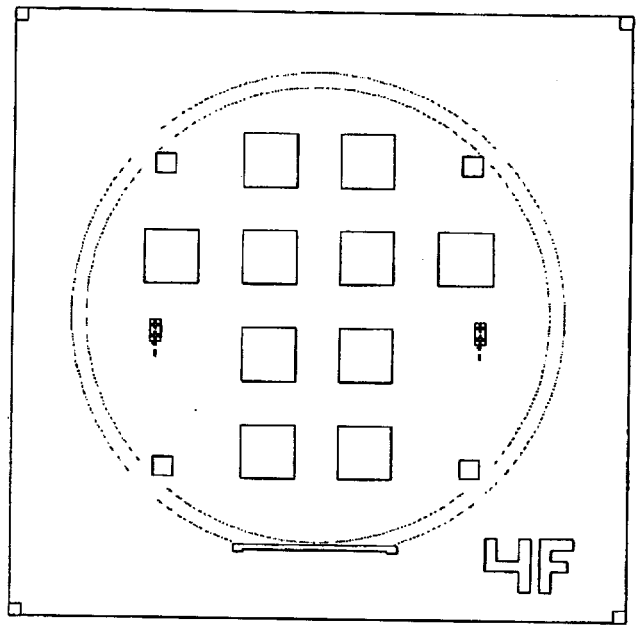
Figure 59B:
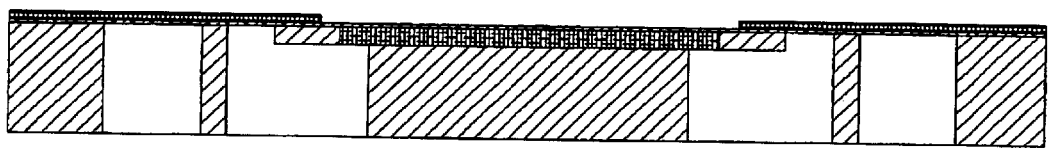

2.22 Deposit photoresists patterned from mask C1-4F on the front side of the silicon substrate—to selectively deposit the palladium-blocking layer (refer to FIGS. 59A and 59B).

Figure 60:
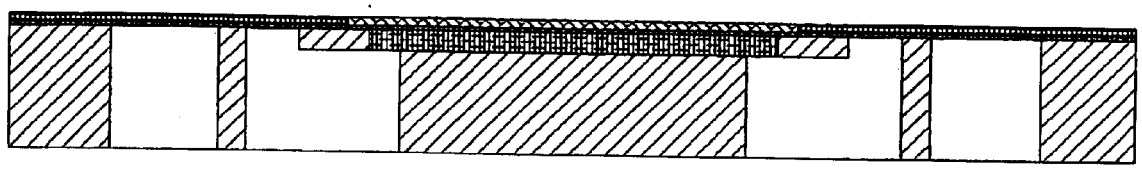

2.23 Pulse plate palladium as a MeOH blocking layer (refer to FIG. 60).

Figure 61:
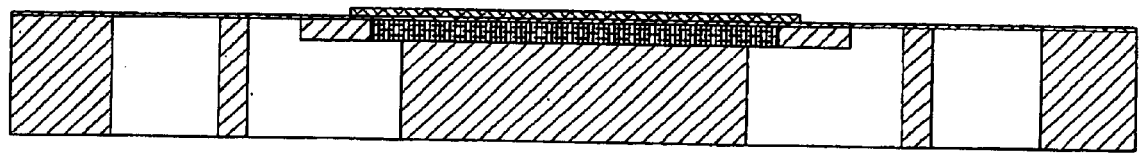

2.24 Strip the photoresist off the front side of the silicon substrate (refer to FIG. 61).

Figure 62A:
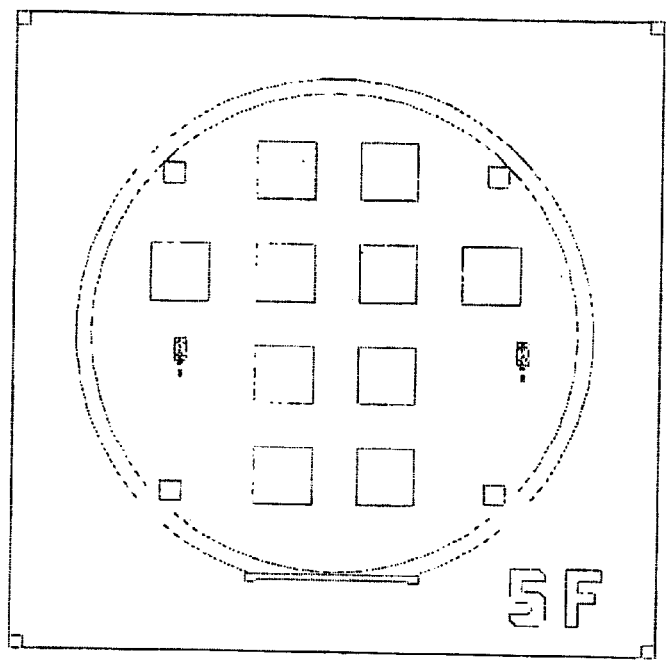
Figure 62B:
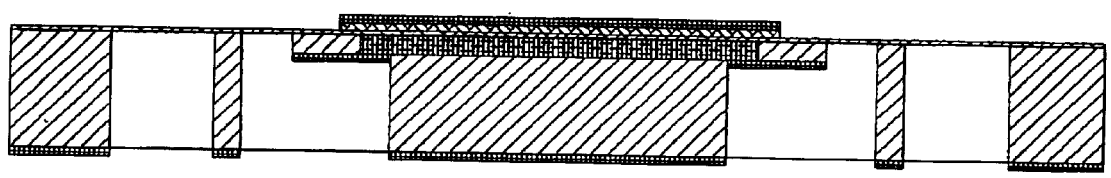

2.25 Deposit photoresists patterned from mask C1-5F on the front side of the silicon substrate and deposit photoresists to cover backside of the silicon substrate—to remove excess seed layer (refer to FIGS. 62A and 62B).

Figure 63:
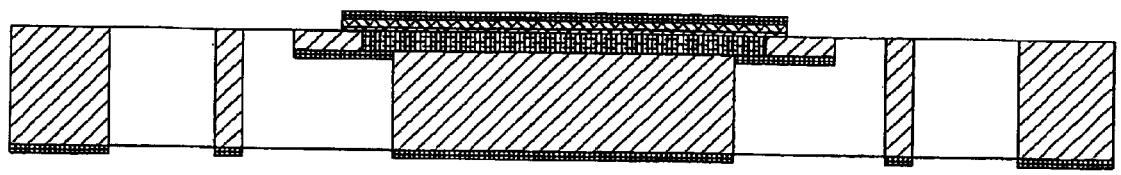

2.26 Remove excess palladium seed layer by chemical etch technique (refer to FIG. 63).

Figure 64:
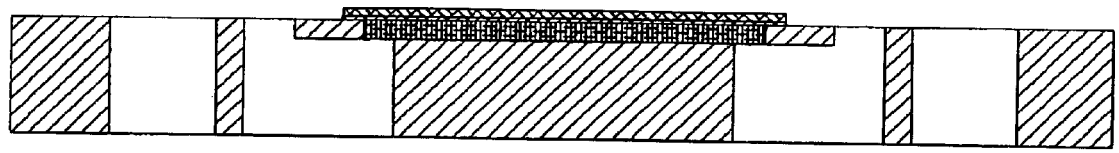

2.27 Strip the photoresists off the front side and backside of the silicon substrate (refer to FIG. 64).

2.28 Catalyst deposition and preparation: (a) Heat the silicon substrate to 200° C. in air for 2 hours; (b) After the silicon substrate has cooled to RT, place silicon wafer in an aqueous ammonia solution of tetraamineplatinum(II) hydroxide hydrate, [Pt(NH$_3$)$_4$](OH)$_2$-xH$_2$O, at pH 8.5 and stir for 10 hours. The solution will contain enough platinum complex to deposit a maximum of 2% weight platinum on silicon, i.e., a 100 mg wafer will be placed in a bath containing 2 mg of platinum (3.4 mg tetraamineplatinum(II) hydroxide hydrate); (c) Remove the silicon wafer from the aqueous ammonia solution and dry in vacuo for 1 hour; (d) Heat silicon substrate under a flow of oxygen/nitrogen (20:80) from RT to 400° C. at a rate of 2° C. per minute, approximately 3 hours, and then hold at 400° C. for 1 hour; (e) Heat the silicon wafer under flowing 1% H$_2$ in N$_2$. The temperature should be rapidly increased from RT to 400° C. at a rate of 25° C. per minute, approximately 15 minutes, and held at 400° C. for 4 hours.

Figure 65A:
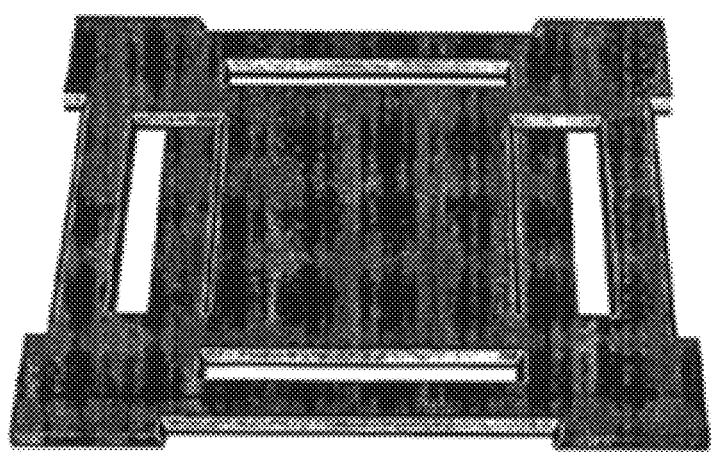
FIGS. 65A, 65B and 65C illustrates top isometric views of a silicon cathode structure in accordance with an embodiment of the present invention.
Figure 65B:
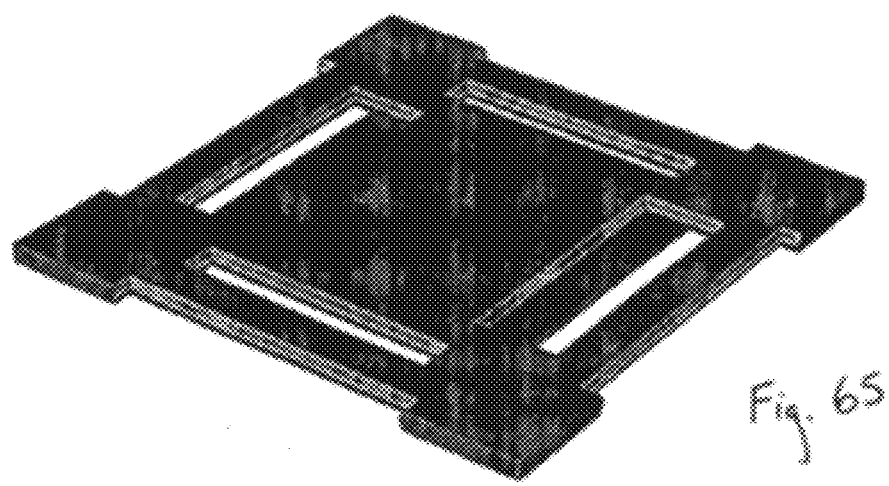
Figure 65C:
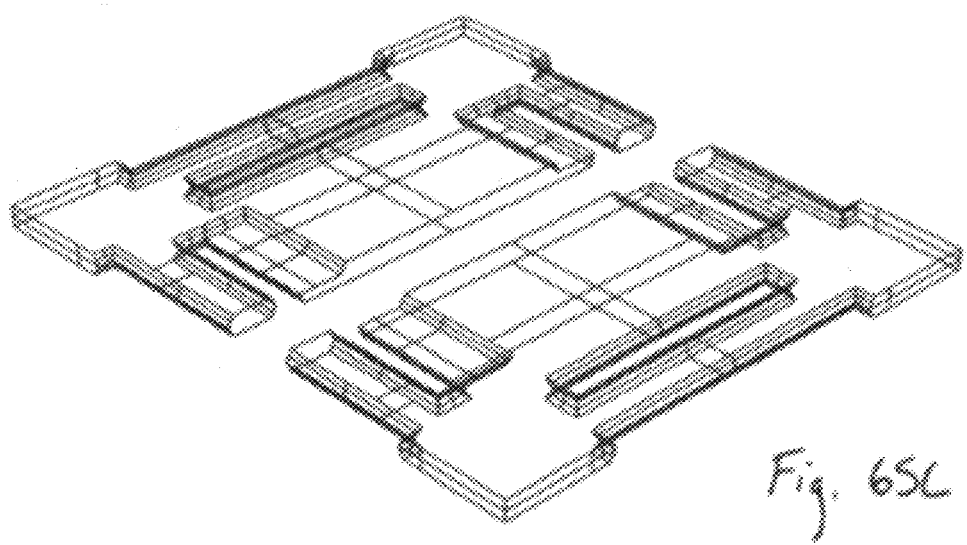

The completed cathode structure manufactured in accordance with the above processing steps is illustrated in FIGS. 65A, 65B and 65C, respectively.

While the porous silicon electrode of the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

We claim:

1. An electrode structure adapted for use with a fuel cell system, characterized in that the electrode structure comprises a silicon substrate having one or more selectively doped regions thereon, wherein each of the one or more selectively doped regions is adapted to function as a currant collector for the transmission of an electrical current, and wherein the silicon substrate further comprises one or more discrete porous bulk matrix regions disposed across a top surface, wherein each of the one or more discrete bulk matrix porous regions is defined by a plurality of pores that extend into the silicon substrate, wherein the plurality of pores defines line pore surfaces, wherein the inner pore suites have catalyst particles uniformly dispersed thereon, and wherein the one or more selectively doped regions corresponds to the one or more discrete porous bulk matrix regions, and wherein the plurality of pores are interconnecting mesoporous acicular pores, interconnecting macroporous acicular pores, or a combination thereof.

2. The electrode structure of claim 1, wherein each of the one or more discrete bulk matrix regions is defined by a plurality of pores that extend into and through the silicon substrate.

3. The electrode structure of claim 1, wherein the silicon substrate has atop surface and a bottom surface, and wherein the plurality of pores that extend into the silicon substrate are perpendicularly aligned with respect to the top surface and the bottom surface.

4. The electrode structure of claim 1, wherein to silicon substrate hag a top surface and, bottom surface and wherein the plurality of pores that extend into the silicon substrate are angularly aligned with respect to the top surface and the bottom surface.

5. The electrode structure of claim 3, wherein the silicon substrate his a top surface and a bottom surface, and wherein the plurality of pores that extend into and through the silicon substrate are perpendicularly aligned with respect to the top surface and the bottom surface.

6. The electrode structure of claim 2, wherein the silicon substrate bus a top surface and bottom surface, and wherein the plurality of porn that extend into and through the silicon substrate are angularly aligned with respect to the top surface and bottom surface.

* * * * *

UNITED STATES PATENT AND TRADEMARK OFFICE
CERTIFICATE OF CORRECTION

PATENT NO. : 6,808,840 B2
DATED : October 26, 2004
INVENTOR(S) : Jonathan C. Mallari and Chung M. Chan It is certified that error appears in the above-identified patent and that said Letters Patent is hereby corrected as shown below:

Column 13,
Line 24, "currant" should be -- current --
Line 32, "suites" should be -- surfaces --

Column 14,
Line 11, "atop" should be -- a top --
Line 16, "hag" should be -- has --
Line 27, "porn" should be -- pores --

Signed and Sealed this

Twenty-fifth Day of January, 2005

JON W. DUDAS
*Director of the United States Patent and Trademark Office*